US011615720B2

(12) United States Patent
Park et al.

(10) Patent No.: US 11,615,720 B2
(45) Date of Patent: Mar. 28, 2023

(54) DISPLAY DEVICE

(71) Applicant: Samsung Display Co., Ltd., Yongin-Si (KR)

(72) Inventors: In Soo Park, Hwaseong-si (KR); Jin Yong Sim, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 40 days.

(21) Appl. No.: 17/306,138

(22) Filed: May 3, 2021

(65) Prior Publication Data

US 2022/0068167 A1 Mar. 3, 2022

(30) Foreign Application Priority Data

Aug. 26, 2020 (KR) .................. 10-2020-0107981
Nov. 5, 2020 (KR) .................. 10-2020-0146722

(51) Int. Cl.
*G09F 9/30* (2006.01)
*G06F 1/16* (2006.01)

(52) U.S. Cl.
CPC ............ *G09F 9/301* (2013.01); *G06F 1/1616* (2013.01); *G06F 1/1681* (2013.01)

(58) Field of Classification Search
CPC combination set(s) only.
See application file for complete search history.

(56) References Cited

U.S. PATENT DOCUMENTS

| | | | |
|---|---|---|---|
| 9,250,733 B2 | 2/2016 | Lee et al. | |
| 9,557,771 B2 | 1/2017 | Park et al. | |
| 9,848,502 B1 | 12/2017 | Chu et al. | |
| 10,423,019 B1 | 9/2019 | Song | |
| 10,545,541 B1* | 1/2020 | Dighde | G06F 1/1652 |
| 10,585,457 B2* | 3/2020 | Park | G06F 1/1652 |
| 10,743,430 B2 | 8/2020 | Myeong et al. | |
| 10,761,574 B1* | 9/2020 | Hsu | G06F 1/1626 |
| 10,824,197 B1* | 11/2020 | Hsu | G06F 1/1641 |
| 11,073,863 B2* | 7/2021 | Kim | G06F 1/1652 |
| 11,099,691 B2* | 8/2021 | Park | G06F 1/1652 |
| 11,231,754 B2* | 1/2022 | Kang | G06F 1/1652 |
| 11,385,686 B2* | 7/2022 | Ai | H04M 1/022 |
| 2019/0012028 A1* | 1/2019 | Park | G06F 3/044 |
| 2020/0103935 A1 | 4/2020 | Hsu | |
| 2020/0375046 A1* | 11/2020 | Sim | H05K 5/0017 |
| 2021/0037664 A1* | 2/2021 | Sun | G06F 1/1615 |

(Continued)

FOREIGN PATENT DOCUMENTS

KR 1020150142290 A 12/2015
KR 101875855 B1 7/2018

(Continued)

*Primary Examiner* — Lisa Lea-Edmonds

(74) *Attorney, Agent, or Firm* — Cantor Colburn LLP

(57) ABSTRACT

A display device includes a display module including a first non-folding region, a second non-folding region, and a folding region disposed between the first and second non-folding regions, a first body disposed on the first non-folding region, a second body disposed on the second non-folding region, a plurality of rotation pin units connected to the first and second bodies to provide a biaxial rotation axis, which is overlapped with the folding region, to the first and second bodies, and a plurality of gears which rotate in conjunction with the rotation pin units. The plurality of gears is disposed on the rotation pin units.

23 Claims, 28 Drawing Sheets

(56) References Cited

U.S. PATENT DOCUMENTS

| | | | | |
|---|---|---|---|---|
| 2021/0119171 A1* | 4/2021 | Kim | .................... | H01L 51/0097 |
| 2021/0227709 A1* | 7/2021 | Sim | ....................... | G06F 1/1681 |
| 2022/0113770 A1* | 4/2022 | Kang | ...................... | E05D 3/122 |
| 2022/0182476 A1* | 6/2022 | Cha | ..................... | H04M 1/0268 |

FOREIGN PATENT DOCUMENTS

| | | |
|---|---|---|
| KR | 1020190082357 A | 7/2019 |
| KR | 102085235 B1 | 3/2020 |

\* cited by examiner

DISPLAY DEVICE

This application claims priority to Korean Patent Application No. 10-2020-0107981, filed on Aug. 26, 2020, and Korean Patent Application No. 10-2020-0146722, filed on Nov. 5, 2020, and all the benefits accruing therefrom under 35 U.S.C. § 119, the content of which in their entirety is herein incorporated by reference.

BACKGROUND

1. Field

Embodiments of the invention relate to a display device, and in particular, to a foldable display device.

2. Description of the Related Art

Electronic products, such as a smart phone, a digital camera, a laptop computer, a navigation system, and a smart television include a display device for displaying an image to a user. The display device generates an image and provides the image to a user through a screen.

With a development of display technologies, various display devices are being developed recently. Flexible display devices, which may be curvedly deformable, foldable, or rollable, are being developed, for example. Since a shape of the flexible display device is variously changeable, the flexible display device has advantages in portability and user convenience.

A foldable display device, which is one of the flexible display devices, includes a display module that may be folded along a folding axis extending in a predetermined direction. The display module may be folded or unfolded along the folding axis. The display module includes a folding region which may be folded by a folding operation.

SUMMARY

An embodiment of the invention provides a display device including a hinge, which is used to fold a display module in a dumbbell shape.

In an embodiment of the invention, a display device includes a display module including a first non-folding region, a second non-folding region, and a folding region disposed between the first and second non-folding regions, a first body disposed on the first non-folding region, a second body disposed on the second non-folding region, a plurality of rotation pin units connected to the first and second bodies to provide a biaxial rotation axis, which is overlapped with the folding region, to the first and second bodies, and a plurality of gears which rotate in conjunction with the plurality of rotation pin units. The plurality of gears is disposed on the plurality of rotation pin units.

In an embodiment of the invention, a display device includes a display module including a first non-folding region, a second non-folding region, and a folding region disposed between the first and second non-folding regions, a first body disposed on the first non-folding region, a second body disposed on the second non-folding region, a hinge connected to the first and second bodies to provide a biaxial rotation axis to the first and second bodies, a first wing plate rotatably coupled to a portion of the first body, which is adjacent to a side portion of the first body facing the second body, and a second wing plate rotatably coupled to a portion of the second body, which is adjacent to a side portion of the second body facing the side portion of the first body. A surface of the first body facing the display module and a surface of the first wing plate facing the display module, which are adjacent to each other, and a surface of the second body facing the display module and a surface of the second wing plate facing the display module, which are adjacent to each other, may have curved surfaces.

In an embodiment of the invention, a display device may include a display module, a first body disposed on the display module, a second body disposed on the display module and spaced apart from the first body, a plurality of rotation pin units providing a biaxial rotation axis to the first and second bodies, a plurality of bracket bodies connecting the plurality of rotation pin units to the first and second bodies, a first frame, to which the plurality of rotation pin units is coupled, a plurality of gears, which are disposed on the plurality of rotation pin units, are rotated in conjunction with the plurality of rotation pin units, and are coupled to the first frame, and a plurality of bracket cams including side portions coupled to some of the plurality of gears. Opposite side portions of the plurality of bracket cams are moved along guide grooves, which are defined in the bracket bodies, when the display module is folded.

BRIEF DESCRIPTION OF THE DRAWINGS

Embodiments will be more clearly understood from the following brief description taken in conjunction with the accompanying drawings. The accompanying drawings represent non-limiting, embodiments as described herein.

Figure 1:
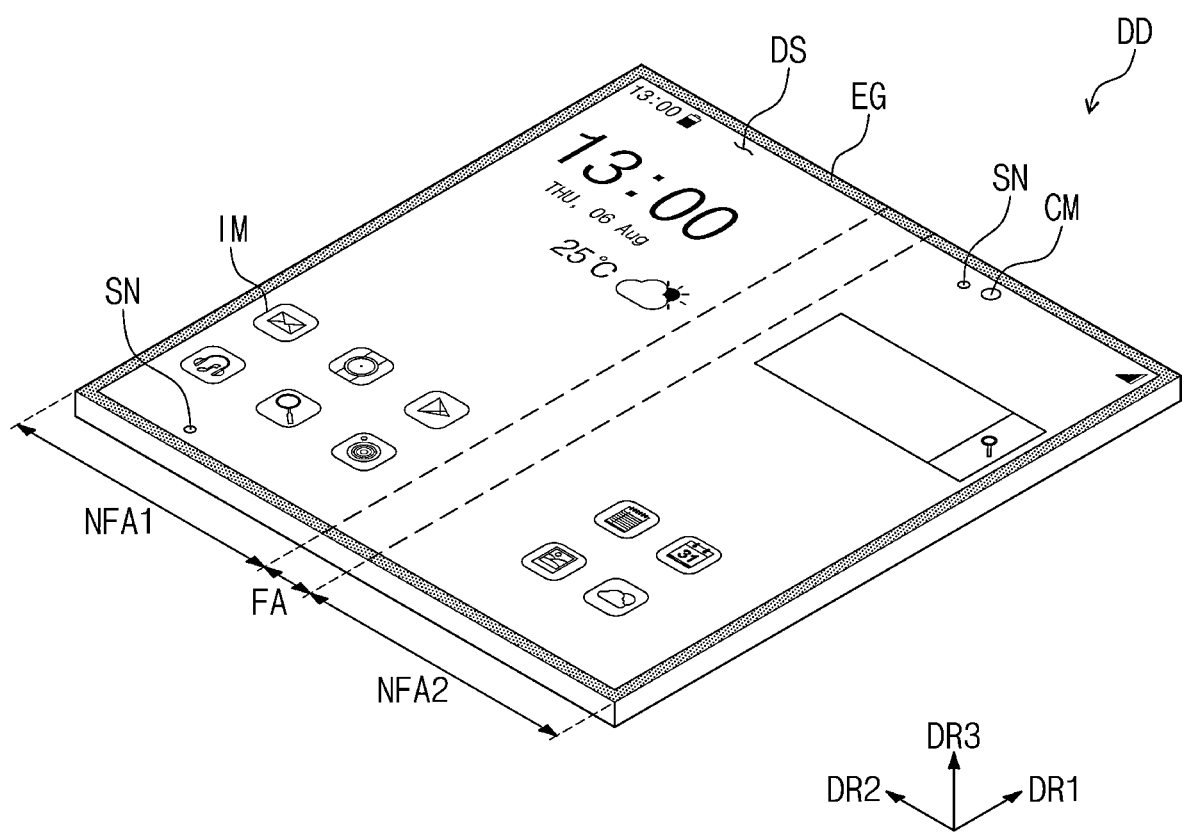
FIG. 1 is a perspective view illustrating an embodiment of a display device according to the invention.

It should be noted that these drawing figures are intended to illustrate the general characteristics of methods, structure and/or materials utilized in predetermined embodiments and to supplement the written description provided below. These drawings are not, however, to scale and may not precisely reflect the precise structural or performance characteristics of any given embodiment, and should not be interpreted as defining or limiting the range of values or properties encompassed by embodiments. In an embodiment, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Embodiments of the inventions will now be described more fully with reference to the accompanying drawings, in which embodiments are shown. Embodiments of the inventions may, however, be embodied in many different forms and should not be construed as being limited to the embodiments set forth herein; rather, these embodiments are provided so that this invention will be thorough and complete, and will fully convey the concept of embodiments to those of ordinary skill in the art. In the drawings, the thicknesses of layers and regions are exaggerated for clarity. Like reference numerals in the drawings denote like elements, and thus their description will be omitted.

It will be understood that when an element is also referred to as being "connected" or "coupled" to another element, it may be directly connected or coupled to the other element or intervening elements may be present. In contrast, when an element is also referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of embodiments.

Spatially relative terms, such as "beneath," "below," "lower," "above," "upper" and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. In an embodiment, when the device in the drawing figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of embodiments. As used herein, the singular forms "a," "an" and "the" are intended to include the plural forms as well, unless the context clearly indicates otherwise. It will be further understood that the terms "comprises", "comprising", "includes" and/or "including," when used herein, specify the presence of stated features, integers, steps, operations, elements and/or components, but do not preclude the presence or addition of one or more other features, integers, steps, operations, elements, components and/or groups thereof.

Embodiments of the inventions are described herein with reference to cross-sectional illustrations that are schematic illustrations of idealized embodiments (and intermediate structures) of embodiments. As such, variations from the shapes of the illustrations as a result, for example, of manufacturing techniques and/or tolerances, are to be expected. Thus, embodiments of the inventions should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which embodiments of the inventions belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
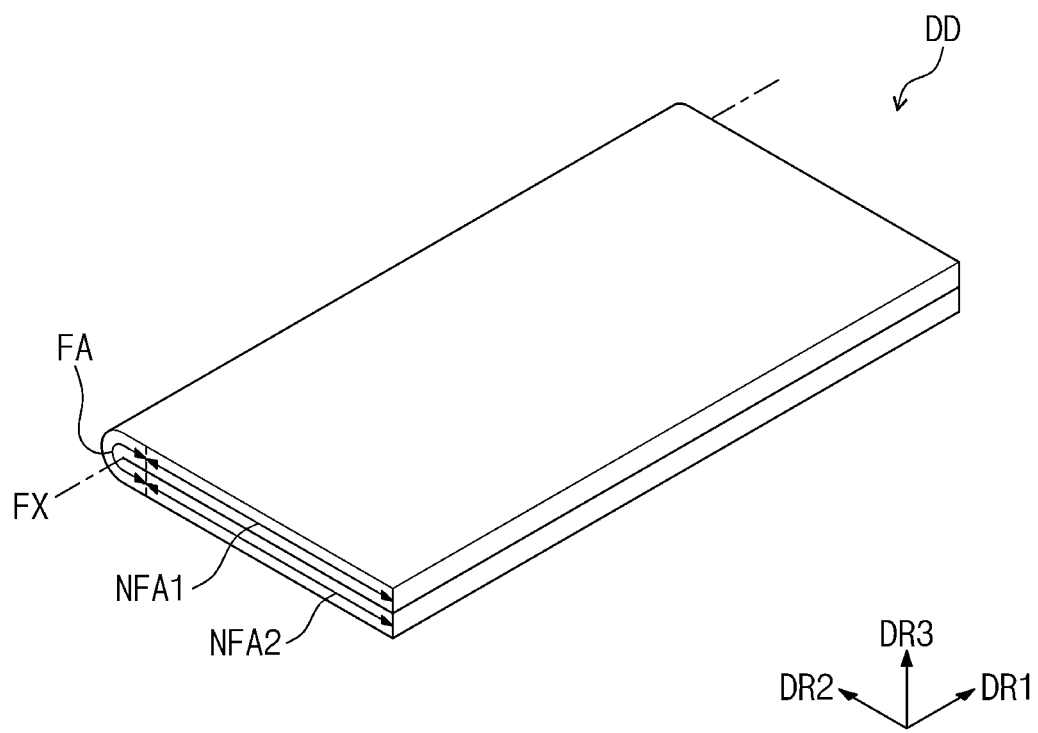
FIG. 2 is a perspective view illustrating a folding state of the display device of FIG. 1.

FIG. 1 is a perspective view illustrating an embodiment of a display device according to the invention. FIG. 2 is a perspective view illustrating a folding state of the display device of FIG. 1.

Referring to FIG. 1, a display device DD in an embodiment of the invention may have a quadrangular (e.g., rectangular) shape including long sides parallel to a first direction DR1 and short sides parallel to a second direction DR2 crossing the first direction DR1. However, the invention is not limited to this example, and in an embodiment, the display device DD may have one of various shapes (e.g., circular and polygonal shapes). The display device DD may be a flexible display device.

Hereinafter, a direction perpendicular to both of the first and second directions DR1 and DR2 will be also referred to as a third direction DR3. Furthermore, the expression "in a plan view" in the specification will be used to describe a structure viewed in the third direction DR3.

The display device DD may include a folding region FA and a plurality of non-folding regions NFA1 and NFA2. The non-folding regions NFA1 and NFA2 may include a first non-folding region NFA1 and a second non-folding region NFA2. The folding region FA may be disposed between the first and second non-folding regions NFA1 and NFA2. The folding region FA, the first non-folding region NFA1, and the second non-folding region NFA2 may be arranged in the second direction DR2.

Although one folding region FA and two non-folding regions NFA1 and NFA2 are illustrated, the numbers of the folding region FA and the non-folding regions NFA1 and NFA2 are not limited to this example. In an embodiment, the display device DD may include two or more non-folding regions and a plurality of folding regions, which are disposed between the non-folding regions, for example.

A top surface of the display device DD may be also referred to as a display surface DS, and the display surface DS may have a flat surface defined by the first and second directions DR1 and DR2. Images IM generated by the display device DD may be provided to a user through the display surface DS.

An edge portion EG may be disposed near or around the display surface DS. The edge portion EG may not be used to display an image. The edge portion EG may surround the display surface DS and to define an edge of the display device DD printed with a predetermined color.

Figure 3:
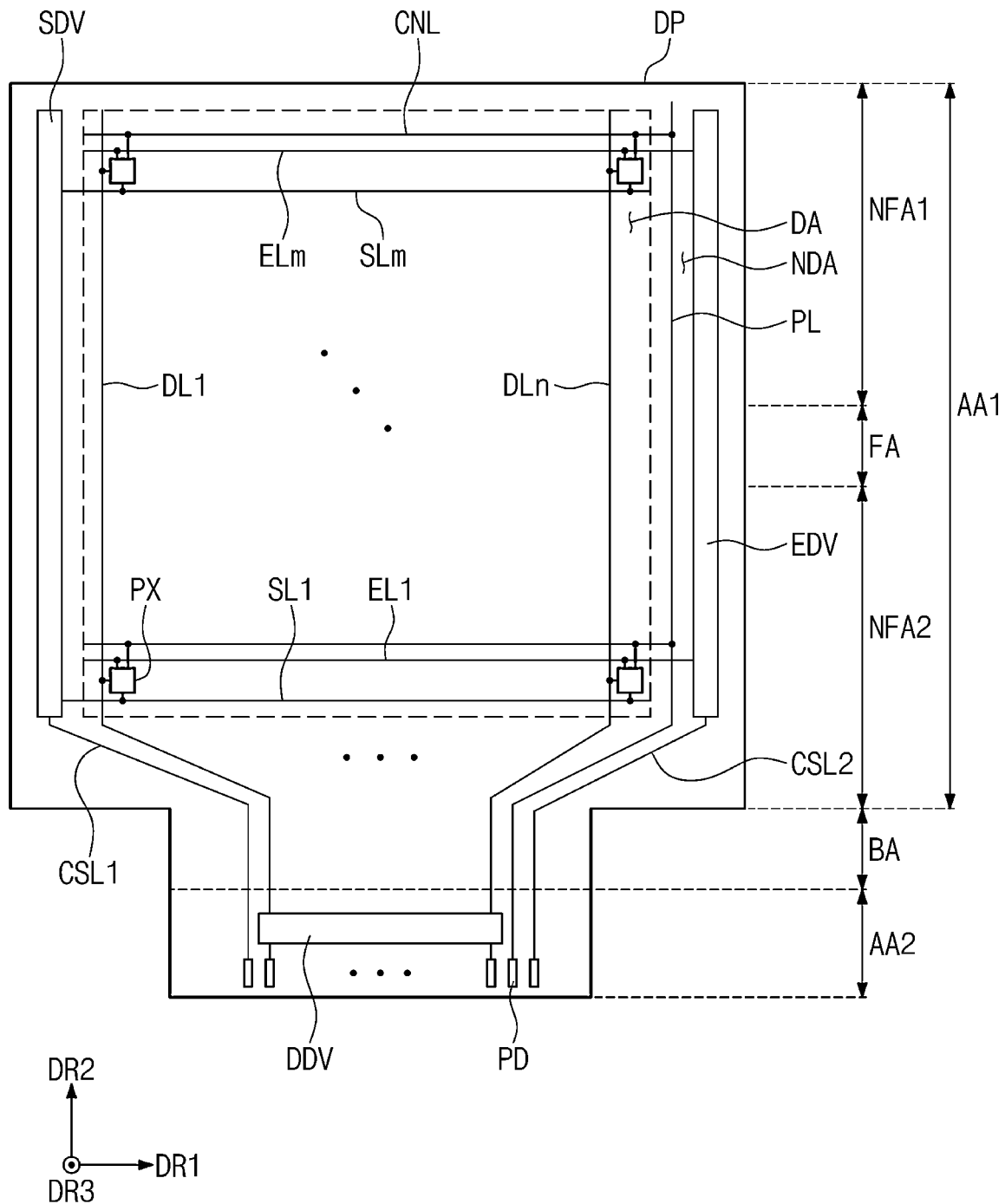
FIG. 3 is a plan view of the display device of FIG. 1.

The display device DD may include a plurality of sensors SN and at least one camera CM. The sensors SN and the camera CM may be provided in portions of the display surface DS adjacent to the edge portion EG. As shown in FIG. 3, the sensors SN and the camera CM may be disposed in a display region DA adjacent to a non-display region NDA. The sensors SN and the camera CM may be disposed in the first and second non-folding regions NFA1 and NFA2.

In an embodiment, the sensors SN may include an optical proximity sensor, but the kind of the sensors SN is not limited thereto. The camera CM may obtain an image of an external object.

Referring to FIG. 2, the display device DD may be a foldable display device, which may be folded or unfolded. In an embodiment, the folding region FA may be bent along a folding axis FX parallel to the first direction DR1, when the display device DD is folded, for example. The folding axis FX may be defined as a long axis that is parallel to the long side of the display device DD.

When the display device DD is folded, the display device DD may be folded in such an in-folding manner that the first and second non-folding regions NFA1 and NFA2 face each other and the display surface DS is not exposed to the outside.

FIG. 3 is a plan view of the display device of FIG. 1.

Referring to FIG. 3, the display device DD may include a display panel DP, a scan driver SDV, a data driver DDV, and an emission driver EDV.

The display panel DP may include a first region AA1, a second region AA2, and a bending region BA between the first and second regions AA1 and AA2. The bending region BA may be extended in the first direction DR1, and the first region AA1, the bending region BA, and the second region AA2 may be arranged in the second direction DR2.

The first region AA1 may include the display region DA and the non-display region NDA near the display region DA. The non-display region NDA may enclose the display region DA. The display region DA may be a region, which is used to display an image, and the non-display region NDA may be a region, which is not used to display the image. The second region AA2 and the bending region BA may not be used to display an image.

The first region AA1 may include the first non-folding region NFA1, the second non-folding region NFA2, and the folding region FA between the first and second non-folding regions NFA1 and NFA2, in the second direction DR2.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, connection lines CNL, and a plurality of pads PD. Here, m and n may be natural numbers. The pixels PX may be provided in the display region DA and may be connected to the scan lines SL1 to SLm, the data lines DL1 to DLn, and the emission lines EL1 to ELm.

The scan driver SDV and the emission driver EDV may be disposed in the non-display region NDA. The scan driver SDV and the emission driver EDV may be respectively disposed in two regions of the non-display region NDA, which are opposite to each other in the first direction DR1 and are disposed at both opposite sides of the first region AA1. The data driver DDV may be disposed in the second region AA2. The data driver DDV may be fabricated in the form of an integrated circuit ("IC") chip and may be disposed (e.g., mounted) on the second region AA2.

The scan lines SL1 to SLm may be extended in the first direction DR1 and may be connected to the scan driver SDV. The data lines DL1 to DLn may be extended in the second direction DR2 and may be connected to the data driver DDV via the bending region BA. The emission lines EL1 to Elm may be extended in the first direction DR1 and may be connected to the emission driver EDV.

The power line PL may be extended in the second direction DR2 and may be disposed in the non-display region NDA. The power line PL may be disposed between the display region DA and the emission driver EDV, but the invention is not limited to this example and may be disposed between the display region DA and the scan driver SDV.

The power line PL may be extended into the second region AA2 through the bending region BA. The power line PL may be extended toward a lower end of the second region AA2, in a plan view. The power line PL may be used to receive a driving voltage.

The connection lines CNL may be extended in the first direction DR1 and may be arranged in the second direction DR2. The connection lines CNL may be connected to the power line PL and the pixels PX. The driving voltage may be applied to the pixels PX through the power line PL and the connection lines CNL connected to the power line PL.

The first control line CSL1 may be connected to the scan driver SDV and may be extended toward the lower end of the second region AA2 via the bending region BA. The second control line CSL2 may be connected to the emission driver EDV and may be extended toward the lower end of the second region AA2 via the bending region BA. The data driver DDV may be disposed between the first control line CSL1 and the second control line CSL2.

In a plan view, the pads PD may be disposed adjacent to the lower end of the second region AA2. The data driver DDV, the power line PL, the first control line CSL1, and the second control line CSL2 may be connected to the pads PD.

The data lines DL1 to DLn may be connected to corresponding ones of the pads PD through the data driver DDV. In an embodiment, the data lines DL1 to DLn may be connected to the data driver DDV, and the data driver DDV may be connected to the pads PD corresponding to the data lines DL1 to DLn, respectively, for example.

Although not shown, a printed circuit board ("PCB") connected to the pads PD may be provided. A timing controller and a voltage generator may be disposed on the PCB. The timing controller may be fabricated in the form of an IC chip and may be disposed (e.g., mounted) on the PCB. The timing controller and the voltage generator may be connected to the pads PD through the PCB.

The timing controller may control operations of the scan driver SDV, the data driver DDV, and the emission driver EDV. The timing controller may generate a scan control signal, a data control signal, and an emission control signal in response to control signals to be transmitted from the outside. The voltage generator may generate the driving voltage.

The scan control signal may be provided to the scan driver SDV through the first control line CSL1. The emission control signal may be provided to the emission driver EDV through the second control line CSL2. The data control signal may be provided to the data driver DDV. The timing controller may receive image signals from the outside, may convert the image signals to a data format, which is suitable for interface specifications desired by the data driver DDV, and may provide the converted data to the data driver DDV.

The scan driver SDV may generate a plurality of scan signals, in response to the scan control signal. The scan signals may be applied to the pixels PX through the scan lines SL1 to SLm. The scan signals may be sequentially applied to the pixels PX.

The data driver DDV may generate a plurality of data voltages, which correspond to the image signals, in response to the data control signal. The data voltages may be applied to the pixels PX through the data lines DL1 to DLn. The emission driver EDV may generate a plurality of emission signals, in response to the emission control signal. The emission signals may be applied to the pixels PX through the emission lines EL1 to ELm.

The pixels PX may receive the data voltages, in response to the scan signals. The pixels PX may emit light, which has a brightness level corresponding to the data voltage, in response to the emission signals, and thereby to display an image. A light-emitting time of the pixel PX may be controlled by the emission signals.

Although not shown, the bending region BA may be bent such that the second region AA2 is placed below the first region AA1. Thus, the data driver DDV may be disposed below the first region AA1 and may be prevented from being recognized by a user.

Figure 4:
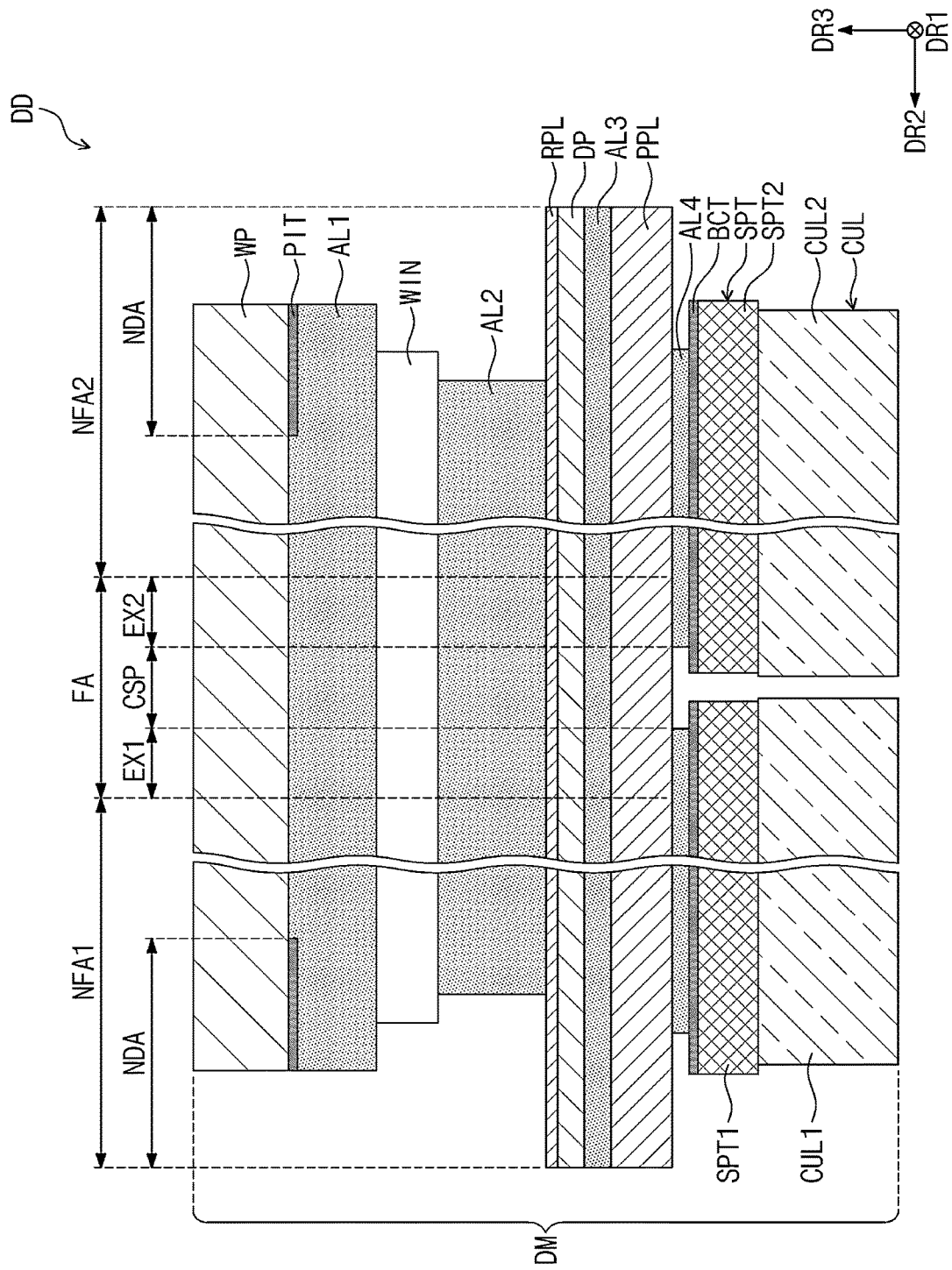
FIG. 4 is a schematic cross-sectional view of the display device of FIG. 1.

FIG. 4 is a schematic cross-sectional view of the display device of FIG. 1.

FIG. 4 illustrates a cross-section of the display device DD viewed in the first direction DR1, but for convenience in illustration, the cross-sections of the bending region BA and the second region AA2 are omitted in FIG. 4.

Referring to FIG. 4, the display device DD may include a display module DM. The display module DM may be a flexible display module. The display device DD may include a folding set, which is used to support and fold the display module DM. The structure of the folding set will be described in more detail with reference to FIG. 7.

The display module DM may include the first non-folding region NFA1, the folding region FA, and the second non-folding region NFA2, which are arranged in the second direction DR2, similar to the display device DD. The folding region FA may include a curved surface portion CSP, a first extended portion EX1 between the curved surface portion CSP and the first non-folding region NFA1, and a second extended portion EX2 between the curved surface portion CSP and the second non-folding region NFA2. The first and second extended portions EX1 and EX2 may be extended from the curved surface portion CSP.

The display module DM may include the display panel DP, an anti-reflection layer RPL, a window WIN, a window protection layer WP, a panel protection layer PPL, a printing layer PIT, a supporting plate SPT, a cushion layer CUL, and a coating layer BCT.

In an embodiment, the display panel DP may be a light-emitting type display panel. In an embodiment, the display panel DP may be an organic light emitting display panel or a quantum dot light-emitting display panel, for example. A light emitting layer of the organic light emitting display panel may include an organic light emitting material. A light emitting layer of the quantum dot light-emitting display panel may include quantum dots and/or quantum rods. For the sake of simplicity, the description that follows will refer to an example in which the display panel DP is the organic light emitting display panel.

The display panel DP may be a flexible display panel. The display panel DP may include the first non-folding region NFA1, the folding region FA, and the second non-folding region NFA2, which are arranged in the second direction DR2, similar to the display module DM. In addition, the folding region FA of the display panel DP may include the curved surface portion CSP, the first extended portion EX1, and the second extended portion EX2, similar to the display module DM. The display panel DP may include a plurality of pixels, which are used to display an image. The pixels may include organic light emitting devices.

The anti-reflection layer RPL may be disposed on the display panel DP. The anti-reflection layer RPL may be directly disposed on a top surface of the display panel DP. However, the invention is not limited to this example, and in an embodiment, the anti-reflection layer RPL may be fabricated as a separate panel and then may be attached to the display panel DP by an adhesive layer.

The anti-reflection layer RPL may be defined as an anti-reflection film to an external light. The anti-reflection layer RPL may reduce reflectance of the external light, which is incident into the display panel DP from the outside of the display device DD.

When the display panel DP, like the mirror, reflects an external light toward a user, the user may recognize the external light. In an embodiment, the anti-reflection layer RPL may include a plurality of color filters displaying the same colors as those of the pixels, and in this case, it may be possible to prevent the reflection phenomenon.

The color filters may filter the external light having the same colors as those of the pixels. In this case, the external light may not be recognized by a user. However, the invention is not limited to this example, and in an embodiment, the anti-reflection layer RPL may include a phase retarder and/or a polarizer, which are used to reduce the reflectance of the external light.

The window WIN may be disposed on the anti-reflection layer RPL. The window WIN may protect the display panel DP and the anti-reflection layer RPL from an external scratch. The window WIN may be optically transparent. The window WIN may consist of or include glass. In an embodiment, the window WIN may be also referred to as an ultra-thin glass ("UTG"), for example. However, the invention is not limited to this example, and in an embodiment, the window WIN may consist of or include a synthetic resin film.

The window protection layer WP may be disposed on the window WIN. The window protection layer WP may protect the window WIN. In an embodiment, the window protection layer WP may consist of or include at least one of flexible plastic materials (e.g., poly imide ("PI") or polyethylene terephthalate ("PET")). Although not shown, a hard coating layer may be further disposed on the window protection layer WP. In an embodiment, at least one functional layer (e.g., an anti-fingerprint layer or a shatter-proof layer) may be further provided on the window protection layer WP.

The panel protection layer PPL may be disposed below the display panel DP. The panel protection layer PPL may protect a bottom portion of the display panel DP. The panel protection layer PPL may include a flexible plastic material. In an embodiment, the panel protection layer PPL may consist of or include PET, for example.

The supporting plate SPT may be disposed below the panel protection layer PPL. The supporting plate SPT may consist of or include a metallic material (e.g., stainless steel). In an embodiment, the supporting plate SPT may consist of or include STS 316, for example, but the invention is not limited to this example and may consist of or include at least one of various metallic materials.

The supporting plate SPT may support the display panel DP. In an embodiment, the supporting plate SPT may have a thickness equal to or less than about 40 micrometers ($\mu m$), for example. A heat-dissipation property of the display device DD may be improved by the supporting plate SPT.

The supporting plate SPT may include a first supporting plate SPT1 disposed in the first non-folding region NFA1 and a second supporting plate SPT2 disposed in the second non-folding region NFA2. The supporting plate SPT may not be disposed in the folding region FA.

The cushion layer CUL may be disposed below the supporting plate SPT. The cushion layer CUL may absorb an external impact, which is exerted on a lower portion of the display module DM, thereby protecting the display module DM. The cushion layer CUL may include a foam sheet having an elastic property. The cushion layer CUL may consist of or include at least one of foam, sponge, polyurethane, or thermoplastic polyurethane.

The cushion layer CUL may include a first cushion layer CUL1 disposed below the first supporting plate SPT1 and a second cushion layer CUL2 disposed below the second supporting plate SPT2. The cushion layer CUL may not be disposed in the folding region FA.

The coating layer BCT may be disposed between the panel protection layer PPL and the supporting plate SPT. The coating layer BCT may be coated on a top surface of the first supporting plate SPT1 and a top surface of the second supporting plate SPT2. The coating layer BCT may consist of or include a black material. The coating layer BCT may prevent elements, which are disposed below the coating layer BCT, from being recognized by a user.

The display device DD may include first to fourth adhesive layers AL1 to AL4. The first adhesive layer AL1 may be disposed between the window protection layer WP and the window WIN. The second adhesive layer AL2 may be disposed between the window WIN and the anti-reflection layer RPL.

The third adhesive layer AL3 may be disposed between the display panel DP and the panel protection layer PPL. The fourth adhesive layer AL4 may be disposed between the panel protection layer PPL and the supporting plate SPT. In detail, the fourth adhesive layer AL4 may be disposed between the panel protection layer PPL and the coating layer BCT.

The first to fourth adhesive layers AL1 to AL4 may include transparent adhesive agents (e.g., pressure sensitive adhesive ("PSA") or optically clear adhesive ("OCA")).

The window protection layer WP and the window WIN may be attached to each other by the first adhesive layer AL1. The window WIN and the anti-reflection layer RPL may be attached to each other by the second adhesive layer AL2.

The display panel DP and the panel protection layer PPL may be attached to each other by the third adhesive layer AL3. The panel protection layer PPL and the supporting plate SPT may be attached to each other by the fourth adhesive layer AL4. In detail, the panel protection layer PPL may be attached to the coating layer BCT by the fourth adhesive layer AL4.

The printing layer PIT may be disposed on a bottom surface of the window protection layer WP. The printing layer PIT may be overlapped with the non-display region NDA, in a plan view. The first adhesive layer AL1 may be disposed below the window protection layer WP to cover the printing layer PIT. In an embodiment, the printing layer PIT may be black, but the invention is not limited to this example. In an embodiment, the printing layer PIT may have various colors, for example.

In a plan view, the fourth adhesive layer AL4 may be overlapped with the first and second non-folding regions NFA1 and NFA2. In addition, in a plan view, the fourth adhesive layer AL4 may be overlapped with the first and second extended portions EX1 and EX2 but may not be overlapped with the curved surface portion CSP. Thus, the first and second supporting plates SPT1 and SPT2 may be attached to the first and second non-folding regions NFA1 and NFA2 and the first and second extended portions EX1 and EX2, but not to the curved surface portion CSP.

In an embodiment, when measured in the third direction DR3, the window WIN may have a thickness that is greater than about 30 $\mu m$ and is smaller than or equal to about 80 $\mu m$, and the window protection layer WP may have a thickness ranging from about 55 $\mu m$ to about 100 $\mu m$, for example. In an embodiment, when measured in the third direction DR3, the supporting plate SPT may have a thickness ranging from about 80 $\mu m$ to about 150 $\mu m$, for example.

When measured in the first and second directions DR1 and DR2, a width of the window protection layer WP may be larger than a width of the window WIN. Here, a width of an element may mean a length measured in a direction perpendicular to a main length extension direction of the element. When measured in the first and second directions DR1 and DR2, a width of each of the display panel DP, the anti-reflection layer RPL, and the panel protection layer PPL may be larger than the width of the window protection layer WP.

When measured in the first and second directions DR1 and DR2, the display panel DP, the anti-reflection layer RPL, and the panel protection layer PPL may have substantially the same width. When measured in the first and second directions DR1 and DR2, a width of the first adhesive layer AL1 may be equal to the width of the window protection layer WP, and a width of the second adhesive layer AL2 may be smaller than the width of the window WIN.

Due to the difference in width between the window WIN and the second adhesive layer AL2, a stepwise structure may be provided between the window protection layer WP and the display panel DP. The window protection layer WP may have a thickness capable of preventing such a stepwise structure from being recognized by a user. In an embodiment, in the case where the window protection layer WP has a thickness of about 55 μm to about 100 μm, the stepwise structure may not be recognized by a user, for example.

In a plan view, the first and second supporting plates SPT1 and SPT2 and the first and second cushion layers CUL1 and CUL2 may be disposed in an inner region of the display panel DP, which is inside of the edge of the display panel DP.

Figure 5:
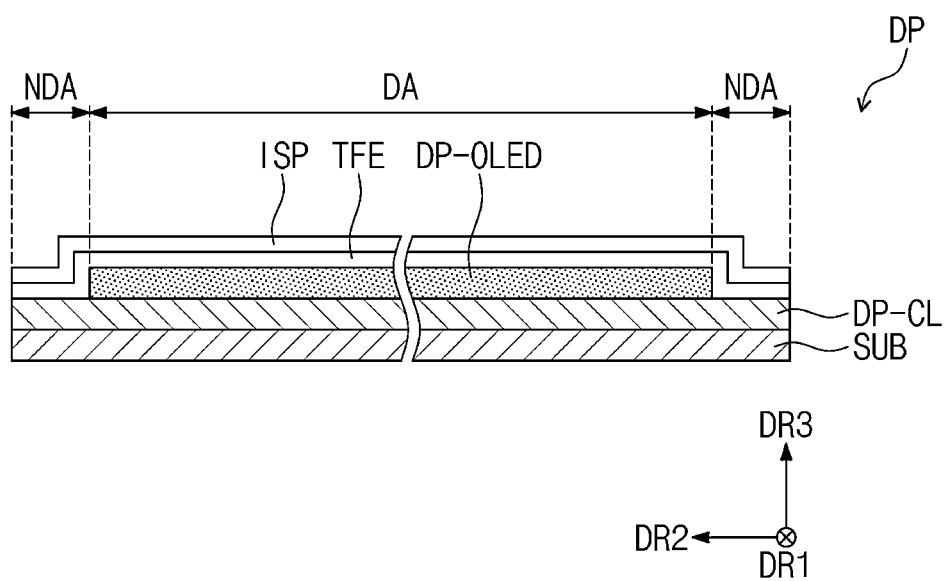
FIG. 5 is a cross-sectional view of the display panel of FIG. 4.

FIG. 5 is a cross-sectional view of the display panel of FIG. 4.

Referring to FIG. 5, the display panel DP may include a substrate SUB, a circuit device layer DP-CL on the substrate SUB, a display device layer DP-OLED on the circuit device layer DP-CL, a thin encapsulation layer TFE on the display device layer DP-OLED, and an input sensing portion ISP on the thin encapsulation layer TFE.

The substrate SUB may include the display region DA and the non-display region NDA near the display region DA. The substrate SUB may include a flexible plastic material. In an embodiment, the substrate SUB may consist of or include PI. The display device layer DP-OLED may be disposed on the display region DA, for example.

The circuit device layer DP-CL may include an insulating layer, a semiconductor pattern, a conductive pattern, and a signal line. An insulating layer, a semiconductor layer, and a conductive layer may be disposed on the substrate SUB by a coating or deposition process. Thereafter, the insulating layer, the semiconductor layer, and the conductive layer may be selectively patterned by performing a photolithography and etching process several times, and as a result, the semiconductor pattern, the conductive pattern, and the signal line may be provided.

The circuit device layer DP-CL may include transistors, which includes the semiconductor patterns, the conductive patterns, and the signal lines. The display device layer DP-OLED may include light-emitting devices connected to the transistors. The pixels PX may include the transistors and the light-emitting devices.

The thin encapsulation layer TFE may be disposed on the circuit device layer DP-CL to cover the display device layer DP-OLED. The thin encapsulation layer TFE may include an inorganic layer, an organic layer, and an inorganic layer, which are sequentially stacked. Inorganic layers may consist of or include an inorganic material and may protect the pixels from moisture and/or oxygen. The organic layer may consist of or include an organic material and may protect the pixels PX from a contamination material such as dust particles.

The input sensing portion ISP may include a plurality of sensors (not shown), which are used to sense an external input. The sensors may sense an external input in a capacitance manner. The external input may include various types of external inputs, such as a portion of the user's body, a pen, light, heat, or pressure.

When the display panel DP is fabricated, the input sensing portion ISP may be directly fabricated on the thin encapsulation layer TFE. However, the invention is not limited to this example, and in an embodiment, the input sensing portion ISP may be fabricated as a panel that is distinct from the display panel DP and then may be attached to the display panel DP by an adhesive layer.

Figure 6:
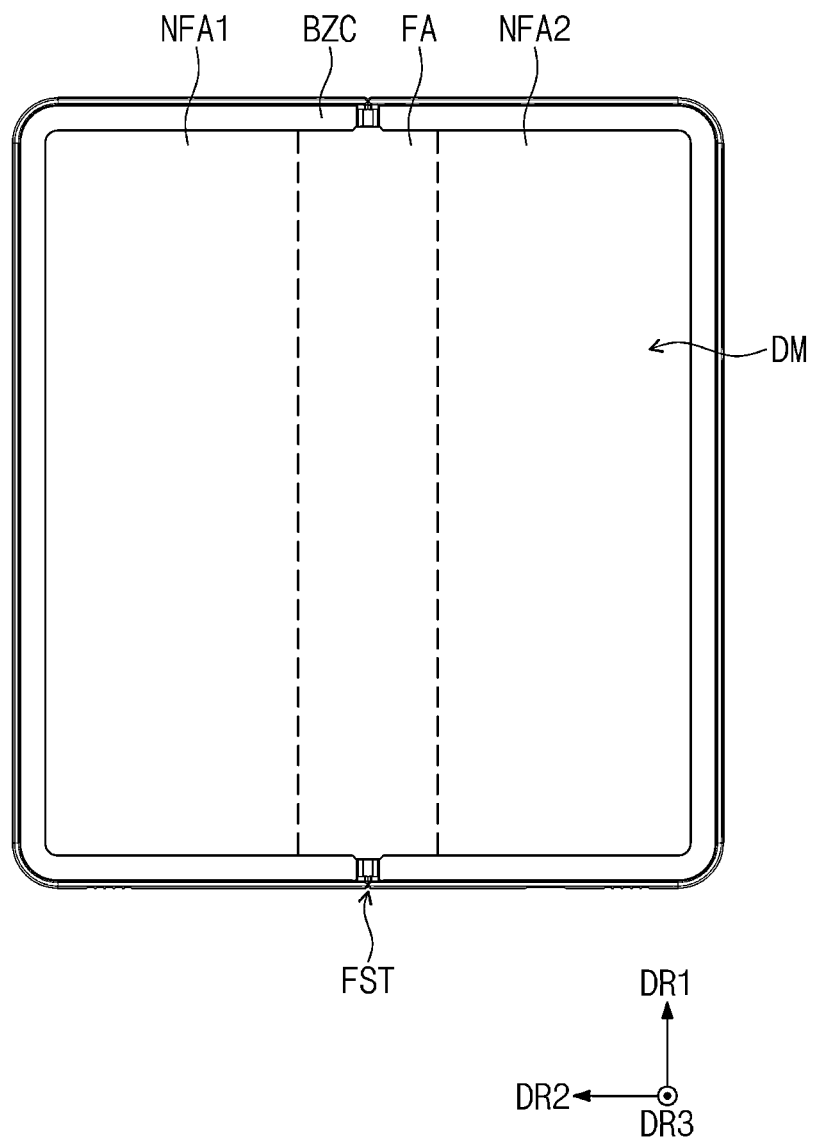
FIG. 6 is a plan view illustrating a detailed structure of the display device of FIG. 1.
Figure 7:
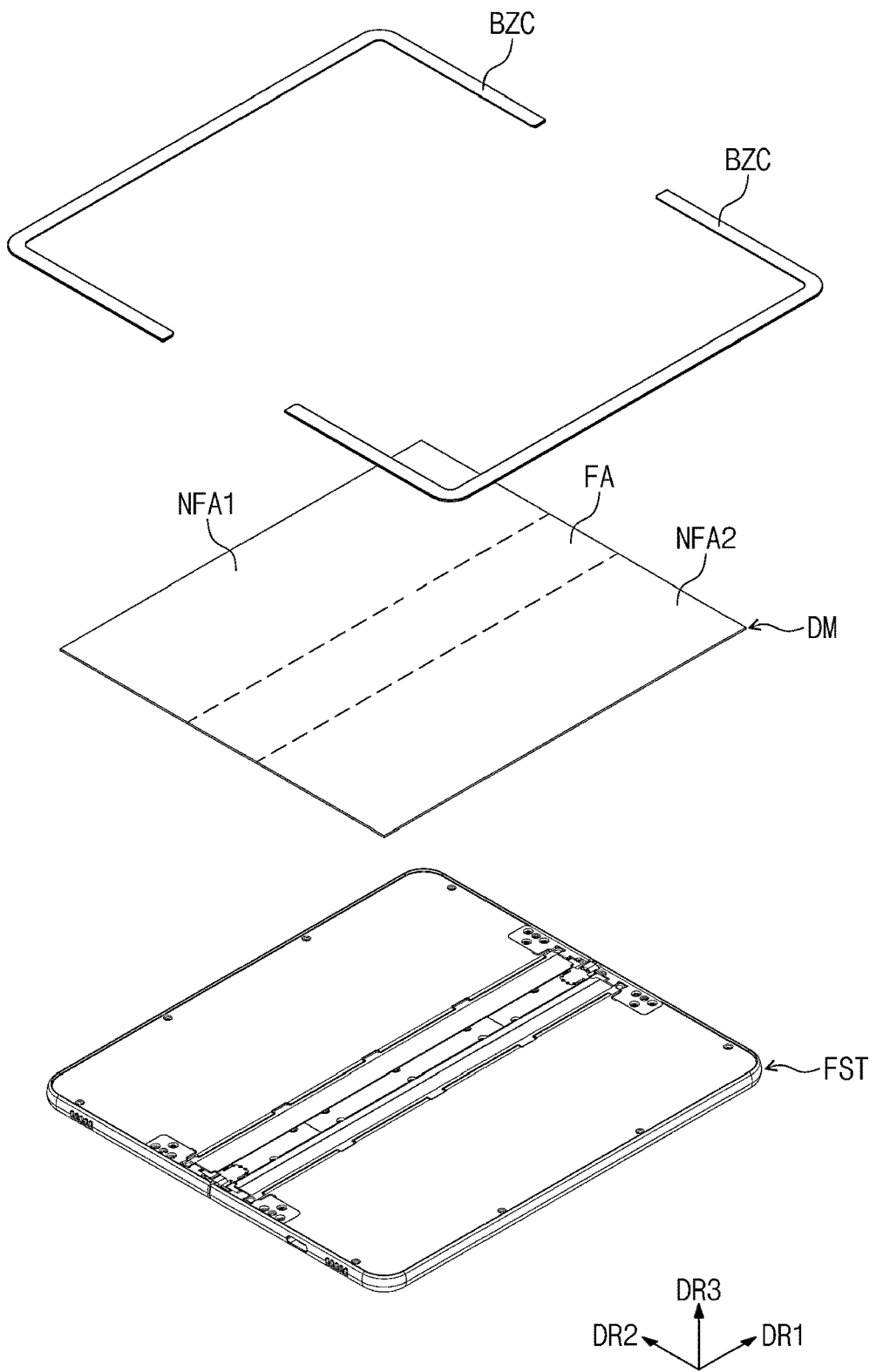
FIG. 7 is an exploded perspective view of the display device of FIG. 6.

FIG. 6 is a plan view illustrating a detailed structure of the display device of FIG. 1. FIG. 7 is an exploded perspective view of the display device of FIG. 6.

Referring to FIGS. 6 and 7, the display device DD may include the display module DM, a bezel cover BZC disposed near the display module DM, and a folding set FST disposed below the display module DM and the bezel cover BZC.

The bezel cover BZC may be disposed near the first and second non-folding regions NFA1 and NFA2 of the display module DM. The bezel cover BZC may enclose the first and second non-folding regions NFA1 and NFA2 of the display module DM. The bezel cover BZC may be black, and the color of the bezel cover BZC is not limited to this example. The edge portion EG of the display device DD shown in FIG. 1 may include the bezel cover BZC.

The folding set FST may be disposed below the display module DM and the bezel cover BZC to support the display module DM and the bezel cover BZC. The folding set FST may be parallel to the first direction DR1 and may be folded along a biaxial folding axis, which is overlapped with the folding region FA in a plan view, when the display module DM is folded. This will be described in more detail below.

Although not shown in FIG. 7, the display module DM and the bezel cover BZC may be attached to the folding set FST by an adhesive layer.

Figure 8:
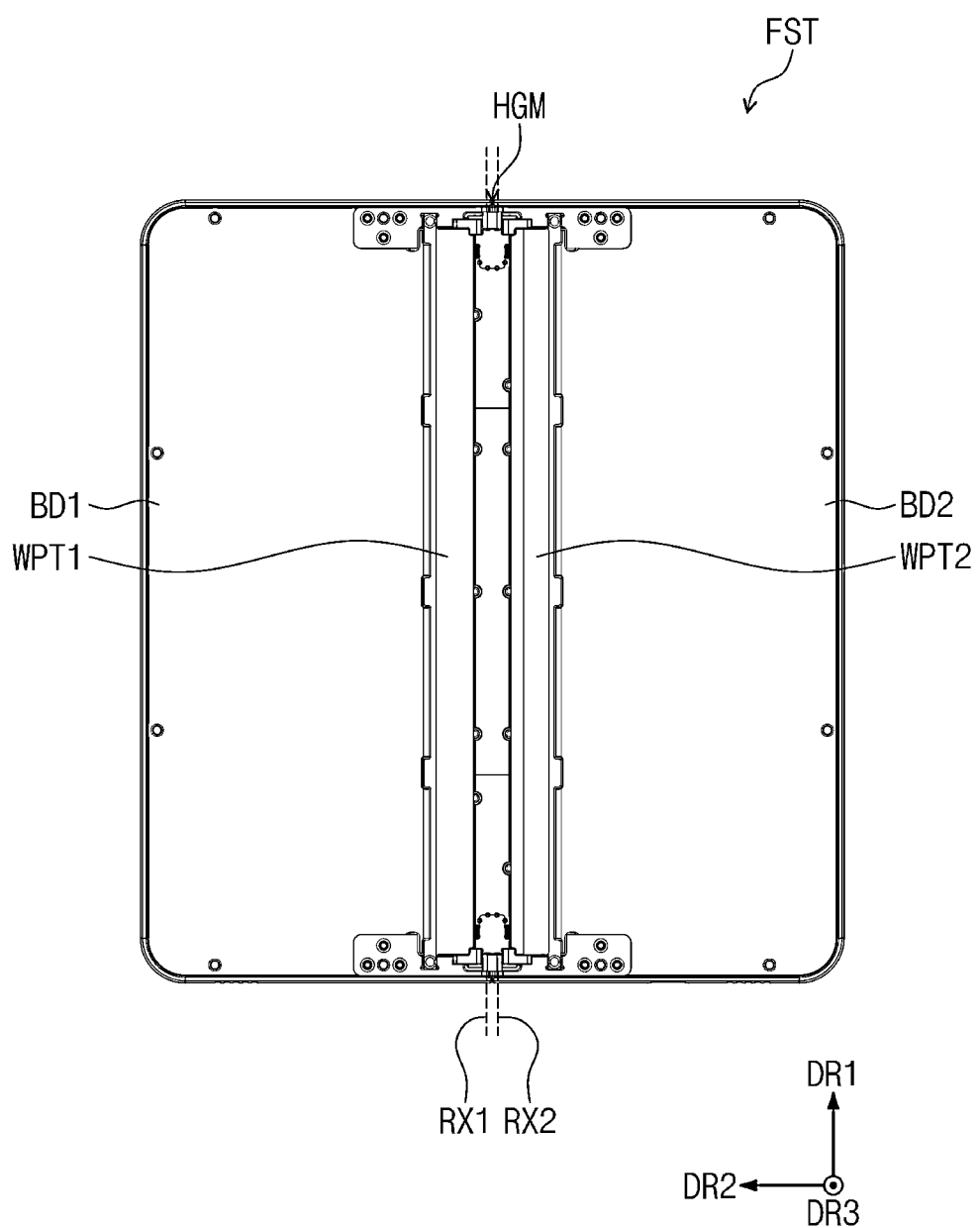
FIG. 8 is a plan view of a folding set of FIG. 7.

FIG. 8 is a plan view of a folding set of FIG. 7.

Referring to FIG. 8, the folding set FST may include a first body BD1, a second body BD2, a hinge module HGM, a first wing plate WPT1, and a second wing plate WPT2. The first and second bodies BD1 and BD2 may be arranged in the second direction DR2. The first and second bodies BD1 and BD2 may have a flat surface defined by the first and second directions DR1 and DR2. The shapes of the first and second bodies BD1 and BD2 may be symmetric to each other in the second direction DR2.

The hinge module HGM may be disposed between the first and second bodies BD1 and BD2. The hinge module HGM may be connected to both opposite side portions of the first body BD1, which are opposite to each other in the first direction DR1, and to both opposite side portions of the second body BD2, which are opposite to each other in the first direction DR1. The hinge module HGM may be connected to the first and second bodies BD1 and BD2 to provide biaxial rotation axes RX1 and RX2 to the first and second bodies BD1 and BD2, respectively.

The biaxial rotation axes RX1 and RX2 may be extended in the first direction DR1. The biaxial rotation axes RX1 and RX2 may include a first rotation axis RX1 and a second rotation axis RX2, which are extended in the first direction DR1 and are spaced apart from each other in the second direction DR2. The biaxial rotation axes RX1 and RX2 may define the folding axis FX shown in FIG. 2.

The first wing plate WPT1 and the second wing plate WPT2 may be arranged in the second direction DR2 and may be extended in the first direction DR1. The shapes of the first and second wing plates WPT1 and WPT2 may be symmetric to each other in the second direction DR2.

Each of the first and second wing plates WPT1 and WPT2 may have a flat surface defined by the first and second directions DR1 and DR2. The first wing plate WPT1 may be adjacent to the hinge module HGM and may be connected to the first body BD1. The second wing plate WPT2 may be adjacent to the hinge module HGM and may be connected to the second body BD2.

Figure 9:
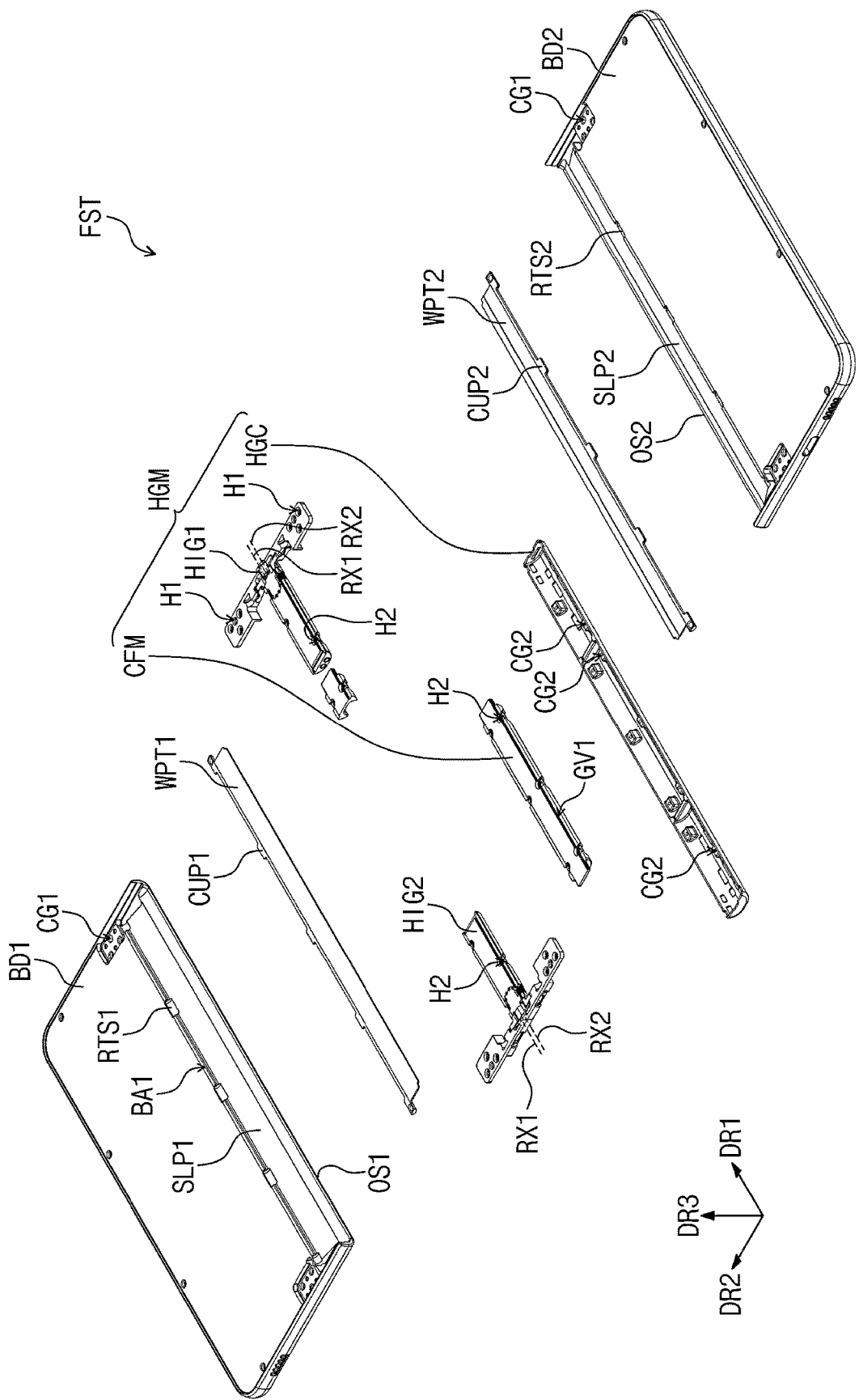
FIG. 9 is an exploded perspective view of a folding set of FIG. 8.

FIG. 9 is an exploded perspective view of a folding set of FIG. 8.

Referring to FIG. 9, a top surface of the first body BD1, which is adjacent to a side portion OS1 of the first body BD1, may have a first inclined surface SLP1. A height of the first inclined surface SLP1 may decrease toward the side portion OS1 of the first body BD1. The first inclined surface SLP1 may have a height difference with the top surface of the first body BD1 near the first inclined surface SLP1.

A top surface of the second body BD2, which is adjacent to a side portion OS2 of the second body BD2, may have a second inclined surface SLP2. The side portion OS2 of the second body BD2 may face the side portion OS1 of the first body BD1. A height of the second inclined surface SLP2 may decrease toward the side portion OS2 of the second body BD2. The second inclined surface SLP2 may have a height difference with the top surface of the second body BD2 near the second inclined surface SLP2.

The first wing plate WPT1 may be disposed on the first body BD1 and may be coupled to the first body BD1. The first wing plate WPT1 may be disposed on the first inclined surface SLP1. The first wing plate WPT1 may be rotatably coupled to a portion of the first body BD1 adjacent to the side portion OS1 of the first body BD1. In an embodiment, the first wing plate WPT1 may be rotatably coupled to an upper side portion of the first inclined surface SLP1, which is most distant from the side portion OS1 of the first body BD1, for example.

A plurality of first rotation surfaces RTS1 may be defined in a portion on the first inclined surface SLP1. The portion on the first inclined surface SLP1 may be defined as a first boundary BA1 between the first inclined surface SLP1 and the top surface of the first body BD1, which are adjacent to each other. The first rotation surfaces RTS1 may be a recessed region, which is defined in the first body BD1. The first rotation surfaces RTS1 may be arranged in the first direction DR1, along the portion on the first inclined surface SLP1.

The first wing plate WPT1 may include a plurality of first coupling portions CUP1, which are outwardly extended from an opposite side portion of the first wing plate WPT1, and here, the opposite side portion of the first wing plate WPT1 is opposite to a side portion of the first wing plate WPT1 facing the second wing plate WPT2. The first coupling portions CUP1 may be arranged in the first direction DR1. The first coupling portions CUP1 may be disposed in the first rotation surfaces RTS1, respectively.

The first wing plate WPT1 may be rotatable about a wing rotation axis, which is adjacent to the opposite side portion of the first wing plate WPT1 and is parallel to the first direction DR1. In an embodiment, the first coupling portions CUP1 may be coupled to the first rotation surfaces RTS1, when it is rotated about the wing rotation axis, for example. The wing rotation axis will be illustrated in FIGS. 23 and 24.

The second wing plate WPT2 may be disposed on the second body BD2 and may be coupled to the second body BD2. The second wing plate WPT2 may be disposed on the second inclined surface SLP2. The second wing plate WPT2 may be rotatably coupled to a portion of the second body BD2 adjacent to the side portion OS2 of the second body BD2. In an embodiment, the second wing plate WPT2 may be rotatably coupled to a portion of the second body BD2, which is most distant from the side portion OS2 and is disposed on the second inclined surface SLP2, for example.

A plurality of second rotation surfaces RTS2 may be defined in a portion on the second inclined surface SLP2. The portion on the second inclined surface SLP2 may be defined as a second boundary BA2 (refer to FIG. 19A) between the second inclined surface SLP2 and the top surface of the second body BD2, which are adjacent to each other. The second rotation surfaces RTS2 may be a recessed region, which is defined in the second body BD2. The second rotation surfaces RTS2 may be arranged in the first direction DR1, along the portion on the second inclined surface SLP2.

The second wing plate WPT2 may include a plurality of second coupling portions CUP2, which are outwardly extended from an opposite side portion of the second wing plate WPT2, and here, the opposite side portion of the second wing plate WPT2 is opposite to a side portion of the second wing plate WPT2 facing the first wing plate WPT1. The second coupling portions CUP2 may be arranged in the first direction DR1. The second coupling portions CUP2 may be disposed in the second rotation surfaces RTS2, respectively.

The second wing plate WPT2 may be rotatable about a wing rotation axis, which is adjacent to the opposite side portion of the second wing plate WPT2 and is parallel to the first direction DR1. In an embodiment, the second coupling portions CUP2 may be coupled to the second rotation surfaces RTS2, when it is rotated about the wing rotation axis, for example.

The hinge module HGM may include a first hinge HIG1, a second hinge HIG2, a center frame CFM, and a hinge cover HGC. The first hinge HIG1 and the second hinge HIG2 may be arranged in the first direction DR1. The shapes of the first and second hinges HIG1 and HIG2 may be symmetric to each other in the first direction DR1. The first and second hinges HIG1 and HIG2 may be connected to the first and second bodies BD1 and BD2 to provide the first and second rotation axes RX1 and RX2 to the first and second bodies BD1 and BD2.

The first hinge HIG1 may be disposed between the first and second bodies BD1 and BD2. The first hinge HIG1 may be connected to one side portion of the first body BD1 among both opposite side portions of the first body BD1 opposite to each other in the first direction DR1 and one side of the second body BD2 among both opposite side portions of the second body BD2 opposite to each other in the first direction DR1.

The second hinge HIG2 may be disposed between the first and second bodies BD1 and BD2. The second hinge HIG2 may be connected to the other side portion of the first body BD1 among the both opposite side portions of the first body BD1 opposite to each other in the first direction DR1 and the other side portion of the second body BD2 among the both opposite side portions of the second body BD2 opposite to each other in the first direction DR1.

A plurality of first holes H1 may be defined in the first and second hinges HIG1 and HIG2. A plurality of first connection grooves CG1 may be defined in the first and second bodies BD1 and BD2. The first and second hinges HIG1 and HIG2 may be connected to the first and second bodies BD1 and BD2 by inserting a plurality of screws (not shown) into the first connection grooves CG1 through the first holes H1.

The center frame CFM may be extended in the first direction DR1 and may be disposed between the first and second hinges HIG1 and HIG2. The center frame CFM may be disposed between the first and second bodies BD1 and BD2. The center frame CFM may be disposed between the first wing plate WPT1 and the second wing plate WPT2.

The hinge cover HGC may be disposed below the first hinge HIG1, the second hinge HIG2, and the center frame CFM. The first hinge HIG1, the second hinge HIG2, and the center frame CFM may be connected to the hinge cover HGC.

In an embodiment, a plurality of second holes H2 may be defined in the first hinge HIG1, the second hinge HIG2, and the center frame CFM, for example. A plurality of second connection grooves CG2 may be defined in the hinge cover HGC. The first hinge HIG1, the second hinge HIG2, and the center frame CFM may be connected to the hinge cover HGC by inserting a plurality of screws (not shown) into the second connection grooves CG2 through the second holes H2.

First grooves GV1 may be defined in upper portions of both opposite side portions of the center frame CFM, which are opposite to each other in the second direction DR2. The first grooves GV1 may be extended in the first direction DR1. When the hinge module HGM is connected to the first and second bodies BD1 and BD2, the side portions of the first and second wing plates WPT1 and WPT2 facing each other may be disposed in the first grooves GV1, respectively.

Figure 10:
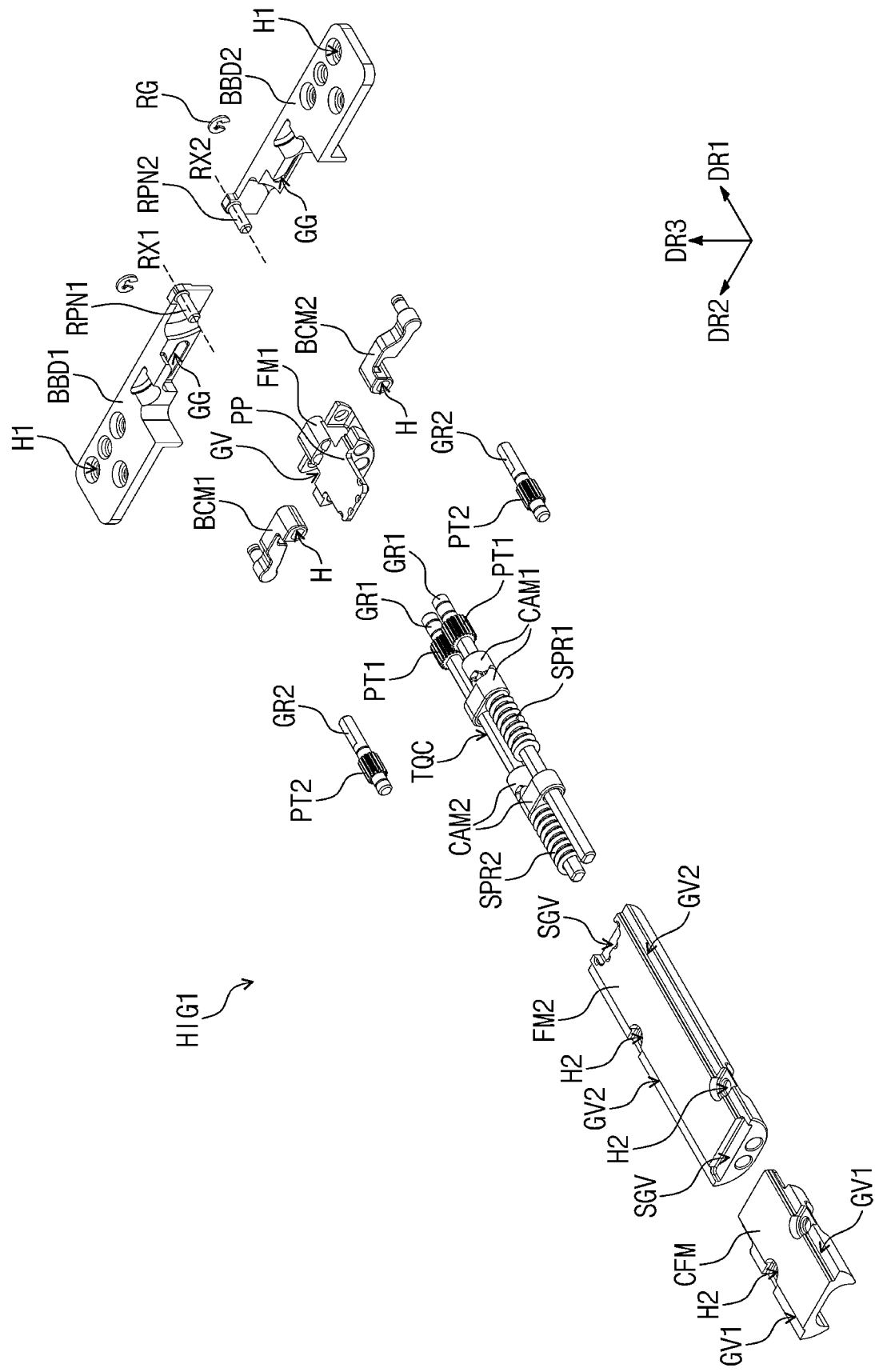
FIG. 10 is an exploded perspective view of a first hinge of FIG. 9.
Figure 11:
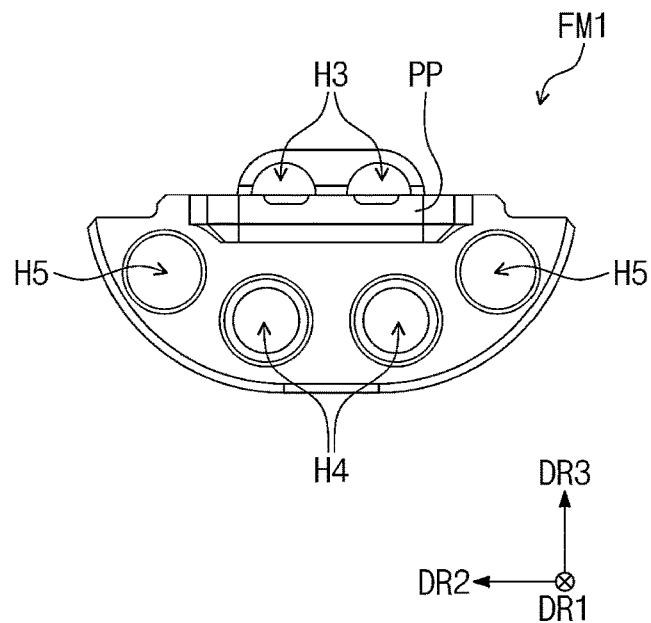
FIG. 11 is a front view illustrating a first frame of FIG. 10 in a first direction.
Figure 12:
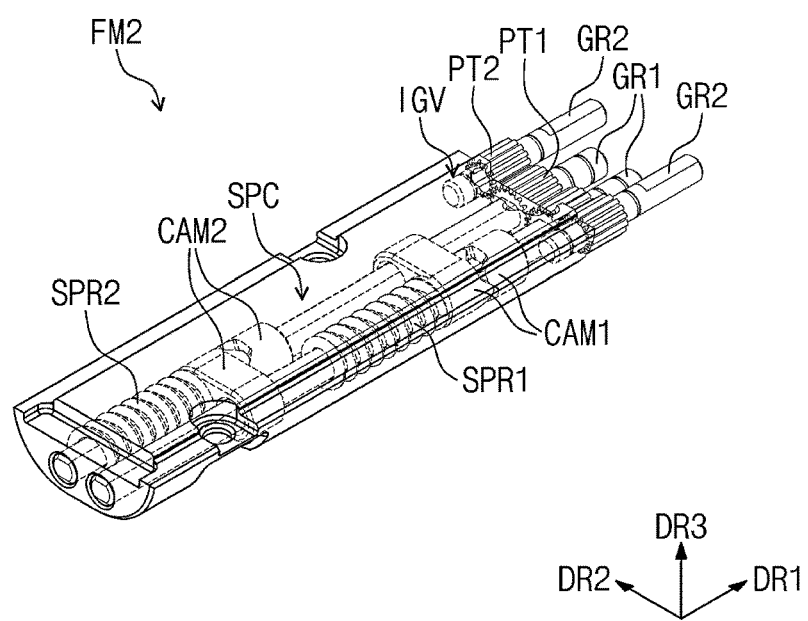
FIG. 12 is a perspective view illustrating an inner structure of a second frame of FIG. 10.

FIG. 10 is an exploded perspective view of a first hinge of FIG. 9. FIG. 11 is a front view illustrating a first frame of FIG. 10 in a first direction. FIG. 12 is a perspective view illustrating an inner structure of a second frame of FIG. 10.

Since the second hinge HIG2 has the same structure as that of the first hinge HIG1, only the structure of the first hinge HIG1 will be described in more detail below, and the description of the second hinge HIG2 will be omitted. In the following description, FIG. 9 will be mentioned along with FIGS. 10, 11, and 12, when necessary.

Referring to FIGS. 9 and 10, the first hinge HIG1 may include a plurality of bracket bodies BBD1 and BBD2, a plurality of rotation pin units RPN1 and RPN2, a plurality of bracket cams BCM1 and BCM2, a first frame FM1, a plurality of gears GR1 and GR2, a plurality of cams CAM1 and CAM2, a plurality of springs SPR1 and SPR2, a second frame FM2, and a plurality of ring units RG. Some gears GR1 of the gears GR1 and GR2, the cams CAM1 and CAM2, and the springs SPR1 and SPR2 may be defined as a torque control unit TQC.

The bracket bodies BBD1 and BBD2 may be connected to the first and second bodies BD1 and BD2 and the rotation pin units RPN1 and RPN2. The rotation pin units RPN1 and RPN2 may be connected to the first and second bodies BD1 and BD2 through the bracket bodies BBD1 and BBD2.

The bracket bodies BBD1 and BBD2 may include a first bracket body BBD1 connected to the first body BD1 and a second bracket body BBD2 connected to the second body BD2. The first bracket body BBD1 and the second bracket body BBD2 may be arranged in the second direction DR2 and may be symmetric to each other in the second direction DR2. The first holes H1 may be defined in the first and second bracket bodies BBD1 and BBD2.

The rotation pin units RPN1 and RPN2 may include a first rotation pin unit RPN1 connected to the first bracket body BBD1 and a second rotation pin unit RPN2 connected to the second bracket body BBD2. The first rotation pin unit RPN1 and the second rotation pin unit RPN2 may be spaced apart from each other in the second direction DR2 and may be extended in the first direction DR1. The first rotation pin unit RPN1 and the second rotation pin unit RPN2 may define the first rotation axis RX1 and the second rotation axis RX2, respectively.

The first rotation pin unit RPN1 and the second rotation pin unit RPN2 may be respectively connected to a side portion of the first bracket body BBD1 and a side portion of the second bracket body BBD2, which face each other in the second direction DR2. The first and second rotation pin units RPN1 and RPN2 may be separately fabricated and then be respectively connected to the first and second bracket bodies BBD1 and BBD2. However, the invention is not limited to this example, and in an embodiment, each of the first and second rotation pin units RPN1 and RPN2 may be unitary with the first and second bracket bodies BBD1 and BBD2 and may be extended from the first and second bracket bodies BBD1 and BBD2.

The first frame FM1, the second frame FM2, and the center frame CFM may be arranged in the first direction DR1. The second frame FM2 may be disposed between the first frame FM1 and the center frame CFM. The first frame FM1 may be disposed between the first and second bracket bodies BBD1 and BBD2 and the second frame FM2.

Referring to FIGS. 10 and 11, the first and second rotation pin units RPN1 and RPN2 may be inserted into the first frame FM1 to be connected to the first frame FM1. In an embodiment, third holes H3 extending in the first direction DR1 may be defined in a portion of the first frame FM1, which is adjacent to an upper portion of the first frame FM1, for example. The first and second rotation pin units RPN1 and RPN2 may be respectively inserted into the third holes H3 to be connected to the first frame FM1.

The gears GR1 and GR2 may be extended in the first direction DR1. The gears GR1 and GR2 may include a plurality of first gears GR1 and a plurality of second gears GR2. Although a pair of the first gears GR1 and a pair of the second gears GR2 are illustrated, the numbers of the first and second gears GR1 and GR2 are not limited thereto. The first gears GR1 may be extended in the first direction DR1 and may be rotated while being engaged with each other in the second direction DR2.

The second gears GR2 may be extended in the first direction DR1 and may be spaced apart from each other in the second direction DR2. The first gears GR1 may be disposed between the second gears GR2. The second gears GR2 may be rotated while being engaged with the first gears GR1 in the second direction DR2. The first and second gears GR1 and GR2 may be rotated about a gear rotation axis (not shown) that is parallel to the first direction DR1.

The first gears GR1 may include a plurality of first protruding portions PT1, which are disposed on outer circumference surfaces of the first gears GR1 adjacent to one side portions of the first gears GR1, among both opposite side portions of the first gears GR1, which are opposite to each other in the first direction DR1. The first protruding portions PT1 may define a gear shape. The first protruding portions PT1 of the first gears GR1 may be moved while being engaged with each other, and thus, the first gears GR1 may be rotated together.

Among both opposite side portions of the second gears GR2, which are opposite to each other in the first direction DR1, side portions of the second gears GR2 may be adjacent to the side portions of the first gears GR1. The second gears GR2 may include a plurality of second protruding portions PT2, which are provided on outer circumference surfaces of the second gears GR2 adjacent to opposite side portions of the second gears GR2, among both opposite side portions of the second gears GR2, to define a gear shape. The second protruding portions PT2 may be moved while being engaged with the first protruding portions PT1, and thus, the second gears GR2 may be rotated along with the first gears GR1.

The first gears GR1 may be inserted into the cams CAM1 and CAM2 and the springs SPR1 and SPR2, and thus, the cams CAM1 and CAM2 and the springs SPR1 and SPR2 may be disposed on the first gears GR1. Opposite side portions of the first gears GR1 may be inserted into the cams CAM1 and CAM2 and the springs SPR1 and SPR2. The cams CAM1 and CAM2 and the springs SPR1 and SPR2 may be disposed between the first protruding portions PT1 and the opposite side portions of the first gears GR1.

The side portions of the first and second gears GR1 and GR2 may be directed toward the first frame FM1, and the opposite side portions of the first and second gears GR1 and GR2 may be directed toward the second frame FM2. The side portions of the first and second gears GR1 and GR2 may be inserted into the first frame FM1, and the opposite side portions of the first and second gears GR1 and GR2 may be inserted into the second frame FM2.

A plurality of fourth and fifth holes H4 and H5 extending in the first direction DR1 may be defined in a portion of the first frame FM1, which is adjacent to a lower portion of the first frame FM1. The fourth and fifth holes H4 and H5 may be defined below the third holes H3. The fourth holes H4 may correspond to the first gears GR1. The fifth holes H5 may correspond to the second gears GR2.

The side portions of the first gears GR1 may be respectively inserted into the fourth holes H4, and thus, the first gears GR1 may be coupled to the first frame FM1. The side portions of the second gears GR2 may be respectively inserted into the fifth holes H5, and thus, the second gears GR2 may be coupled to the first frame FM1.

A portion of the first frame FM1 between the third holes H3 and the fourth holes H4 may be defined as a flat portion PP and may be shaped like a flat plate defined by the first and second directions DR1 and DR2.

Reception grooves SGV may be defined in upper portions of both opposite side portions of the second frame FM2, which face each other in the first direction DR1. An end portion of the flat portion PP may be disposed in the reception groove SGV of the second frame FM2 adjacent to the first frame FM1. An upper portion of a side portion of the center frame CFM may be disposed in the reception groove SGV of the second frame FM2 adjacent to the center frame CFM.

Referring to FIGS. 10 and 12, an internal space SPC and a plurality of insertion holes IGV may be defined in the second frame FM2. The internal space SPC may be defined to correspond to the first gears GR1. The insertion holes IGV may be defined to correspond to the second gears GR2. The opposite side portions of the first gears GR1 may be inserted into the internal space SPC. The opposite side portions of the second gears GR2 may be inserted into the insertion holes IGV, respectively.

Two holes (not referenced) may be defined in an end portion of the internal space SPC, and the opposite side portions of the first gears GR1 may be disposed in the two holes, respectively. The first and second cams CAM1 and CAM2 and the first and second springs SPR1 and SPR2 may be disposed in the internal space SPC of the second frame FM2.

Referring to FIG. 10, the bracket cams BCM1 and BCM2 may include a first bracket cam BCM1 coupled with the first bracket body BBD1 and a second bracket cam BCM2 coupled with the second bracket body BBD2. The first and second bracket cams BCM1 and BCM2 may be arranged in the second direction DR2 and may have shapes that are symmetric to each other in the second direction DR2.

Grooves GV may be defined in both opposite side portions of the first frame FM1, which are opposite to each other in the second direction DR2. The first and second bracket cams BCM1 and BCM2 may be disposed in the grooves GV. Side portions of the first and second bracket cams BCM1 and BCM2, which face each other in the second direction DR2, may be disposed in the grooves GV.

The side portions of the second gears GR2 may be inserted into the side portions of the first and second bracket cams BCM1 and BCM2. Thus, the side portions of the first and second bracket cams BCM1 and BCM2 may be coupled to the second gears GR2. The side portions of the second gears GR2 may be inserted into holes H, which are defined in the side portions of the first and second bracket cams BCM1 and BCM2, and thus, the first and second bracket cams BCM1 and BCM2 may be coupled to the second gears GR2.

Opposite side portions of the first and second bracket cams BCM1 and BCM2 may protrude in the first direction DR1 and may be respectively disposed in guide grooves GG which are defined in the first and second bracket bodies BBD1 and BBD2. The ring units RG may be disposed on the opposite side portions of the first and second bracket cams BCM1 and BCM2 protruding in the first direction DR1.

The guide grooves GG may be defined on surfaces of the first and second bracket bodies BBD1 and BBD2 facing the first and second bracket cams BCM1 and BCM2. The guide grooves GG may be extended in the second direction DR2.

The first and second bracket cams BCM1 and BCM2 may be rotated along with the second gears GR2 and may be moved along the guide grooves GG, when the first and second rotation pin units RPN1 and RPN2 are rotated. This operation will be described in more detail below.

Second grooves GV2 may be defined in upper portions of both opposite side portions of the second frame FM2, which are opposite to each other in the second direction DR2. The second grooves GV2 may be extended in the first direction DR1. The side portion of the first wing plate WPT1 and the side portion of the second wing plate WPT2, which face each other, may be disposed in the second grooves GV2, when the hinge module HGM is connected to the first and second bodies BD1 and BD2.

Figure 13:
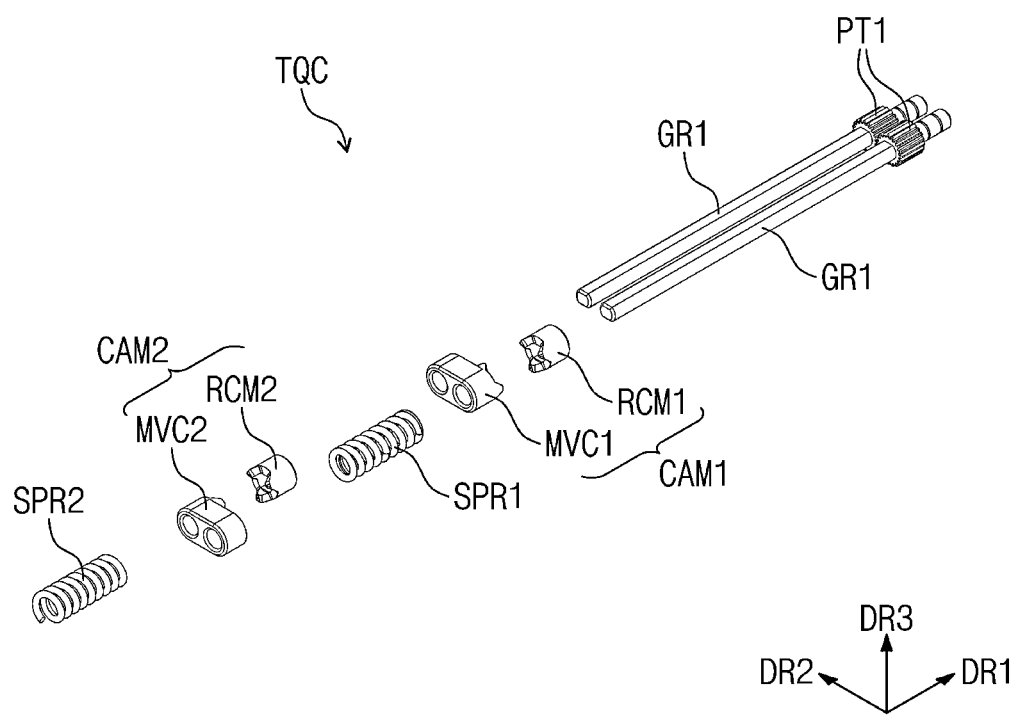
FIG. 13 is an exploded perspective view of a torque control unit of FIG. 10.

FIG. 13 is an exploded perspective view of a torque control unit of FIG. 10.

In the following description, FIG. 10 will be mentioned along with FIG. 13, when necessary.

Referring to FIGS. 10 and 13, the torque control unit TQC may include a plurality of the first gears GR1, a plurality of the cams CAM1 and CAM2, and a plurality of the springs SPR1 and SPR2. The cams CAM1 and CAM2 may include first cams CAM1 and second cams CAM2, which are spaced apart from each other in the first direction DR1.

The first cam CAM1 may include a first moving cam MVC1 and a first rotating cam RCM1. The second cam CAM2 may include a second moving cam MVC2 and a second rotating cam RCM2. The springs SPR1 and SPR2 may include a first spring SPR1 and a second spring SPR2, each of which is extended in the first direction DR1.

The first gears GR1 may be inserted into the first and second moving cams MVC1 and MVC2. The first gears GR1 may be commonly inserted into each of the first and second moving cams MVC1 and MVC2. The first gears GR1 may be inserted into holes, which penetrate each of the first and second moving cams MVC1 and MVC2 in the first direction DR1, although the reference numeral of the holes are not shown. The side portions of the first gears GR1 may pass through the holes, which are defined in the first and second moving cams MVC1 and MVC2, and thus, the first and second moving cams MVC1 and MVC2 may be disposed on outer circumference surfaces of portions of the first gears GR1.

The first gears GR1 may be inserted into the first and second rotating cams RCM1 and RCM2. The first gears GR1 may be respectively inserted into the first and second rotating cams RCM1 and RCM2 in a one-to-one correspondence manner.

The first gears GR1 may be respectively inserted into holes, each of which is defined to penetrate a corresponding one of the first and second rotating cams RCM1 and RCM2 in the first direction DR1, although the reference numeral of the holes are not shown. The side portions of the first gears GR1 may pass through the holes, which are defined in the first and second rotating cams RCM1 and RCM2, and thus, the first and second rotating cams RCM1 and RCM2 may be disposed on outer circumference surfaces of portions of the first gears GR1.

The first gears GR1 may be inserted into the first and second springs SPR1 and SPR2. The first gears GR1 may be respectively inserted into the first and second springs SPR1 and SPR2 in a one-to-one correspondence manner.

Each of the first and second moving cams MVC1 and MVC2 may be disposed between a corresponding pair of the rotating cam and the spring, among the first and second rotating cams RCM1 and RCM2 and the first and second springs SPR1 and SPR2. The corresponding pair of the rotating cam and the spring may be disposed on the same one of the first gears GR1. Thus, each of the first and second moving cams MVC1 and MVC2 may be disposed between a pair of the rotating cam and the spring, which are disposed on a corresponding first gear GR1 of the first gears GR1.

The first moving cam MVC1 may be disposed between the first rotating cam RCM1 and the first spring SPR1, which are disposed on one of the first gears GR1. The second moving cam MVC2 may be disposed between the second rotating cam RCM2 and the second spring SPR2, which are disposed on the other of the first gears GR1.

A surface of the moving cam and a surface of the rotating cam, which are disposed on the same one of the first gears GR1 to face each other, may include protruding portions. The protruding portions of the surface of the moving cam and the protruding portions of the surface of the rotating cam, which are disposed on the same one of the first gears GR1, may be staggered to each other.

In an embodiment, the surface of the first moving cam MVC1 and the surface of the first rotating cam RCM1, which are disposed on one of the first gears GR1 to face each other, may include protruding portions, although the reference number of the protruding portions are not illustrated, for example. The protruding portions of the surface of the first moving cam MVC1 and the protruding portions of the surface of the first rotating cam RCM1 may be staggered to each other.

The surface of the second moving cam MVC2 and the surface of the second rotating cam RCM2, which are disposed on the other of the first gears GR1 to face each other, may include protruding portions, although the reference number of the protruding portions are not illustrated. The protruding portions of the surface of the second moving cam MVC2 and the protruding portions of the surface of the second rotating cam RCM2 may be staggered to each other.

Figure 14:
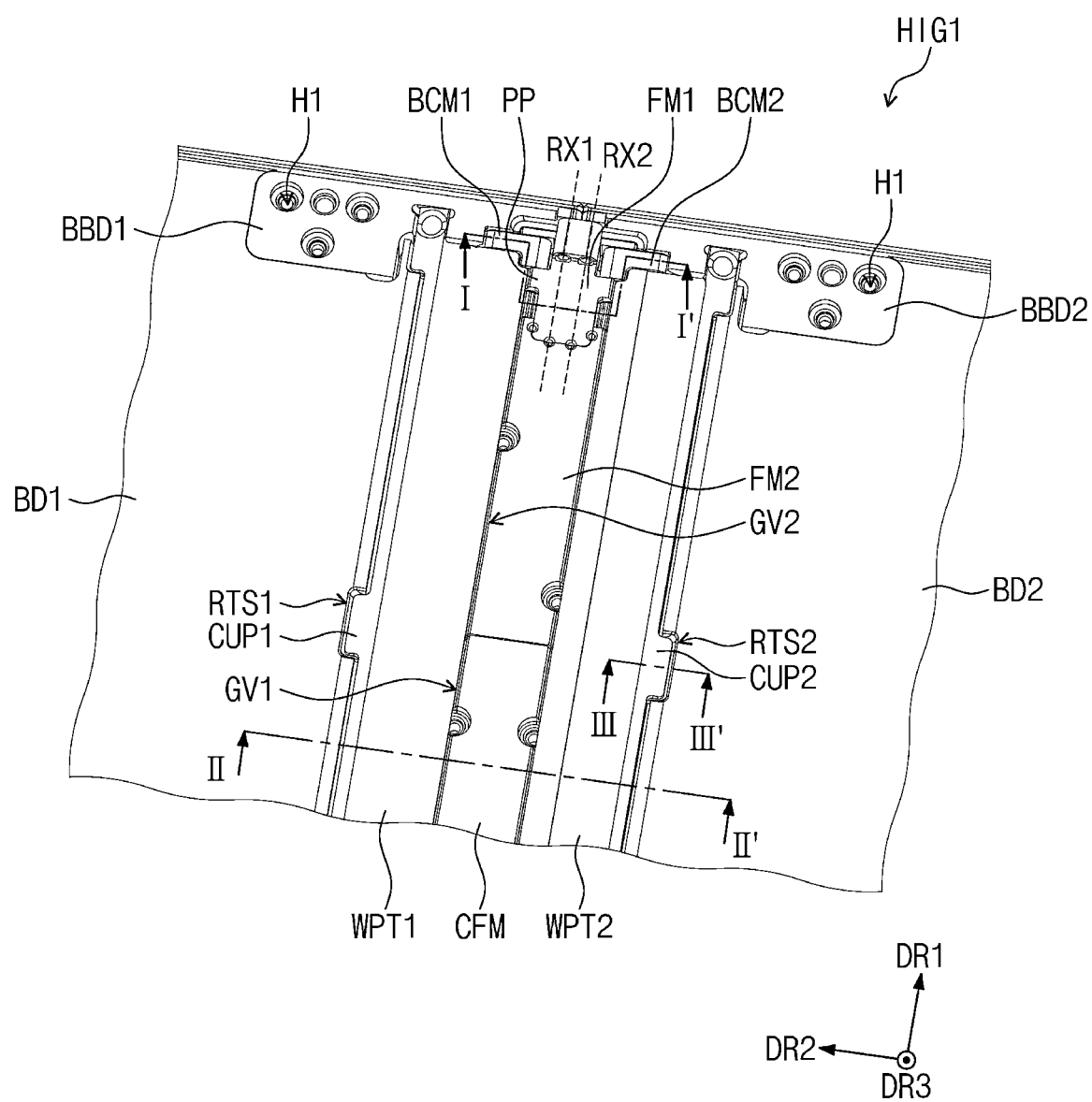
FIG. 14 is a diagram illustrating a structure, in which a first hinge of FIGS. 9 and 10 are coupled to first and second bodies.
Figure 15:
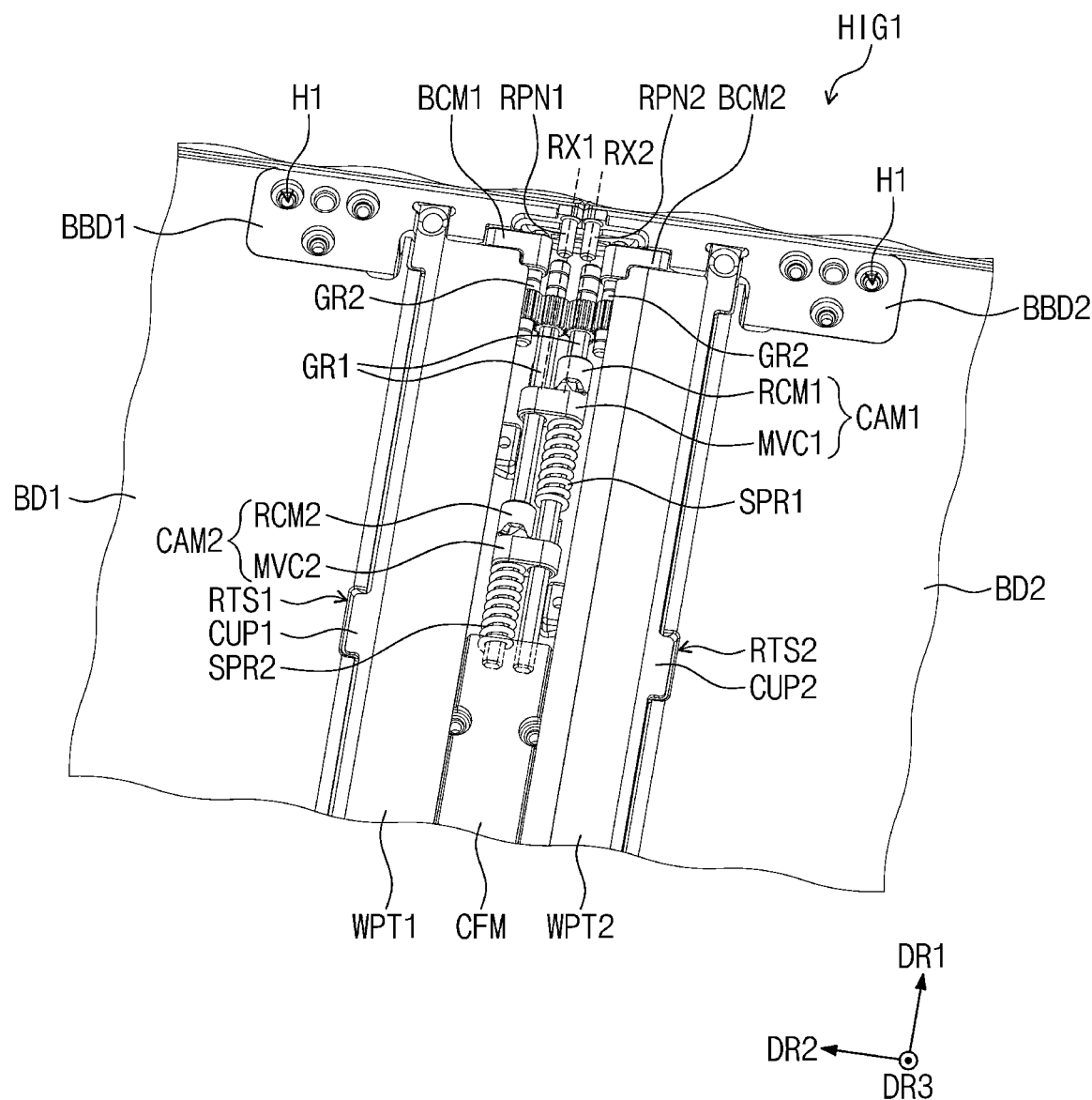
FIG. 15 is a diagram illustrating components, which are disposed in the first and second frames of FIG. 14.

FIG. 14 is a diagram illustrating a structure, in which a first hinge of FIGS. 9 and 10 are coupled to first and second bodies. FIG. 15 is a diagram illustrating components, which are disposed in the first and second frames of FIG. 14.

In order to reduce complexity in the drawings, the first and second frames FM1 and FM2 are omitted from FIG. 15. In the following description, FIG. 10 will be mentioned along with FIGS. 14 and 15, when necessary.

Referring to FIGS. 10, 14, and 15, the first and second bracket bodies BBD1 and BBD2 may be connected to the first and second bodies BD1 and BD2 through the screws inserted into the first holes H1.

The first and second rotation pin units RPN1 and RPN2 may be inserted into the first frame FM1 and may be rotatably coupled to the first frame FM1. The first rotation pin unit RPN1 may define the first rotation axis RX1, and the second rotation pin unit RPN2 may define the second rotation axis RX2.

The first and second bracket cams BCM1 and BCM2 may be coupled to the first and second bracket bodies BBD1 and BBD2. The first and second bracket cams BCM1 and BCM2 may be disposed near the first frame FM1, and the second gears GR2 may be inserted into the first and second bracket cams BCM1 and BCM2, such that the first and second bracket cams BCM1 and BCM2 are coupled to the first frame FM1. The first and second bracket cams BCM1 and BCM2 may be coupled to the second gears GR2 to be rotated along with the second gears GR2.

An end portion of the flat portion PP may be disposed in the reception groove SGV, which is defined in a side portion of the second frame FM2, and the first and second frames FM1 and FM2 may be connected to each other by fastening units (e.g., screws) (not shown).

The first and second gears GR1 and GR2 may be inserted into the first and second frames FM1 and FM2 and thereby may be coupled to the first and second frames FM1 and FM2. The first and second protruding portions PT1 and PT2 may be engaged with each other, and in this case, the first and second protruding portions PT1 and PT2, which are coupled to each other, may rotate together.

The first and second moving cams MVC1 and MVC2, the first and second rotating cams RCM1 and RCM2, and the first and second springs SPR1 and SPR2 may be coupled to the first gears GR1 and may be disposed in the second frame FM2. The first and second rotating cams RCM1 and RCM2 may be coupled to the first gears GR1 to be rotated along with the first gears GR1.

The side portion of the first wing plate WPT1 and the side portion of the second wing plate WPT2 may be disposed on the first grooves GV1 and the second grooves GV2. The first and second coupling portions CUP1 and CUP2 of the first and second wing plates WPT1 and WPT2 may be rotatably coupled to the first and second rotation surfaces RTS1 and RTS2 defined in the first and second bodies BD1 and BD2.

Figure 16A:
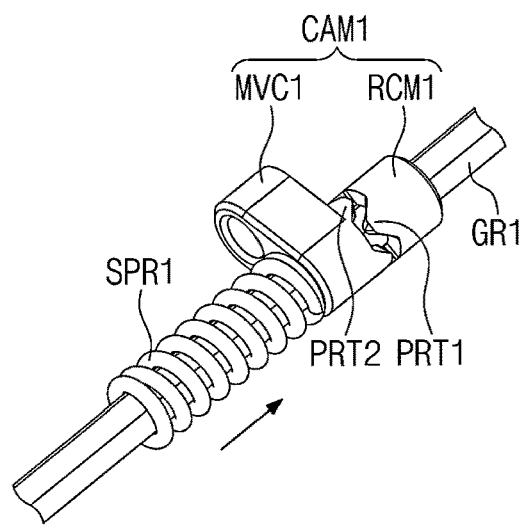
FIGS. 16A and 16B are perspective views illustrating operations of a first rotating cam and a first moving cam shown in FIG. 15.
Figure 16B:
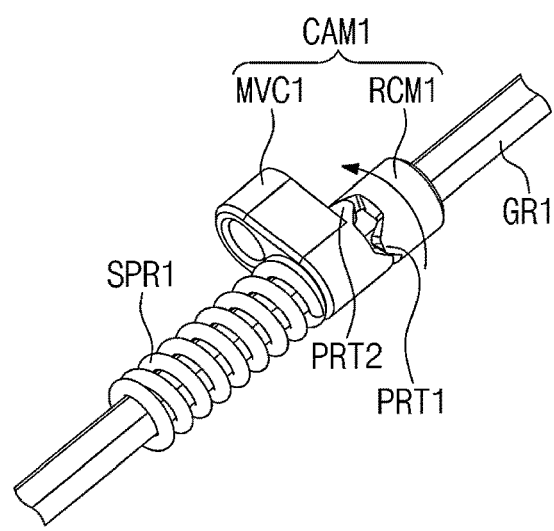

FIGS. 16A and 16B are perspective views illustrating operations of a first rotating cam and a first moving cam shown in FIG. 15.

The description that follows will refer to the operations of the first rotating cam RCM1 and the first moving cam MVC1, but the operations of the second rotating cam RCM2 and the second moving cam MVC2 may also be substantially the same as the operations of the first rotating cam RCM1 and the first moving cam MVC1.

Referring to FIG. 16A, first protruding portions PRT1 of the first rotating cam RCM1 may be disposed between second protruding portions PRT2 of the first moving cam MVC1. Due to a restoring force applied by the first spring SPR1, it may be possible to maintain a state of the first protruding portions PRT1 disposed between the second protruding portions PRT2. FIG. 16A illustrates the first rotating cam RCM1 and the first moving cam MVC1, when the display device DD is in an unfolded state. Since the state of the first protruding portions PRT1 disposed between the second protruding portions PRT2 is maintained, it may be possible to more easily maintain the display device DD in the unfolded state.

Referring to FIG. 16B, the display device DD may be folded by an external force (e.g., from a user). In the case where the first rotating cam RCM1 is rotated by the external force, the first protruding portions PRT1 may pass over the protruding top surfaces of the second protruding portions PRT2 and may move in a counterclockwise direction. In the case where the force from the user becomes stronger than a force desired to maintain the state of the first protruding portions PRT1 disposed between the second protruding portions PRT2, the first protruding portions PRT1 may be moved to pass over the top surfaces of the second protruding portions PRT2, and in this case, the display device DD may be folded.

As a result of the afore-described operation, in the case where the display device DD is unfolded by a user, the unfolded state may be easily maintained, and in the case where the user wants to fold the display device DD, the display device DD may be folded by exerting a force on the display device DD. To realize this operation, the torque control unit TQC including the first and second cams CAM1 and CAM2 may be provided in the hinge module HGM.

Figure 17A:
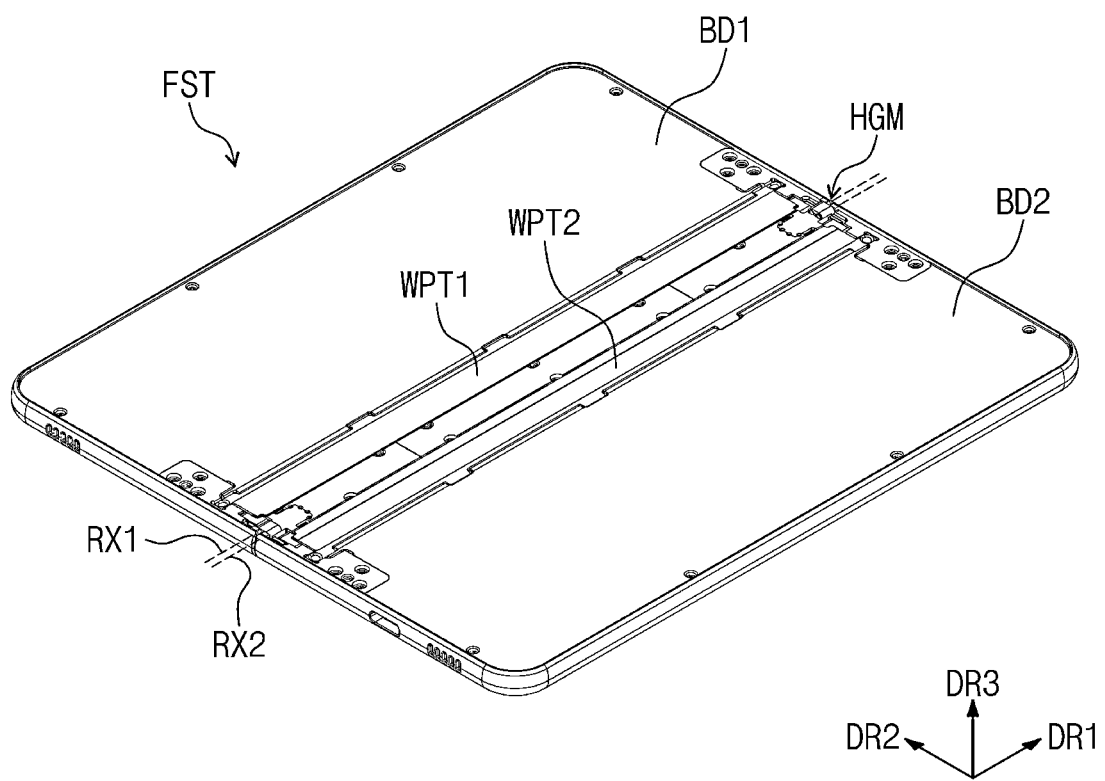
FIG. 17A is a perspective view illustrating an unfolding state of a folding set of FIG. 8.
Figure 17B:
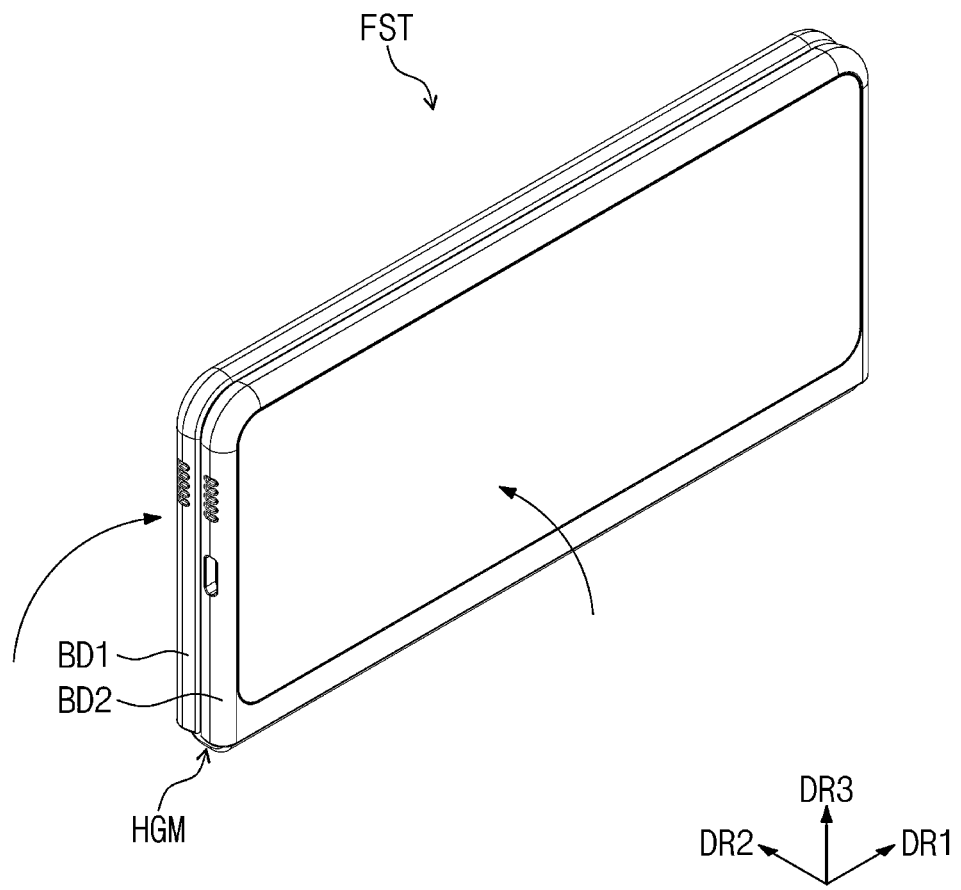
FIG. 17B is a perspective view illustrating a folding state of a folding set of FIG. 17A.

FIG. 17A is a perspective view illustrating an unfolding state of a folding set of FIG. 8. FIG. 17B is a perspective view illustrating a folding state of a folding set of FIG. 17A.

Referring to FIGS. 17A and 17B, the folding set FST may be folded through a rotation about the first and second rotation axes RX1 and RX2 defined by the first and second rotation pin units RPN1 and RPN2. The display module DM, which is disposed on the folding set FST, may be folded or unfolded by the folding operation of the folding set FST.

Figure 18A:
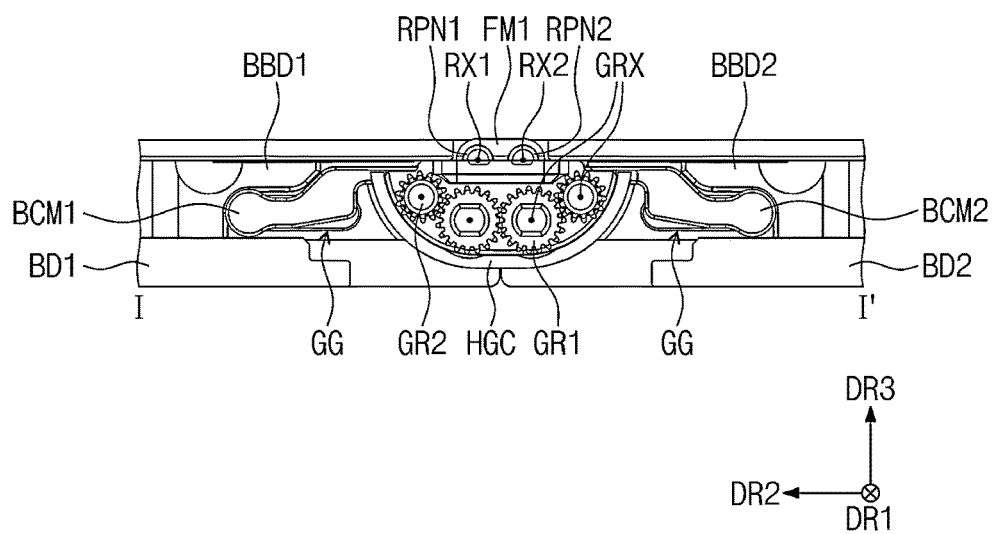
FIG. 18A is a cross-sectional view taken along line I-I' of FIG. 14.
Figure 18B:
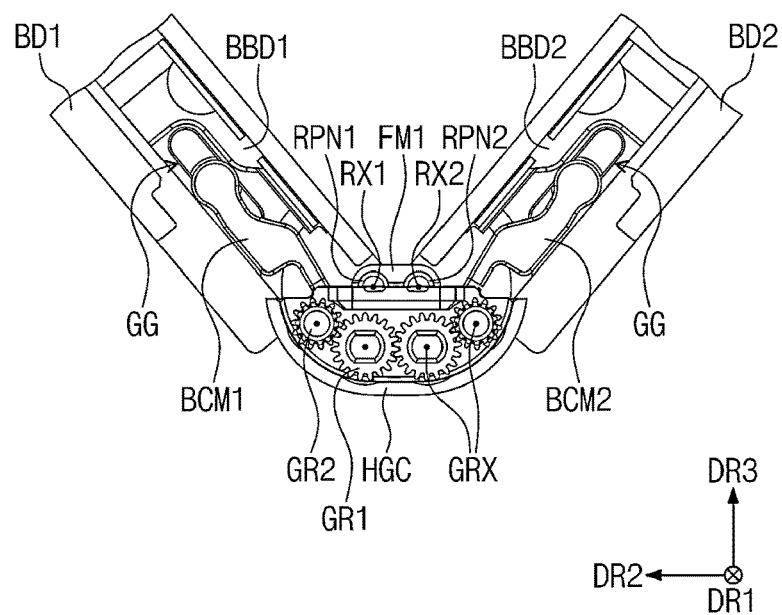
FIGS. 18B and 18C are cross-sectional views illustrating a folding operation of a folding set of FIG. 18A.
Figure 18C:
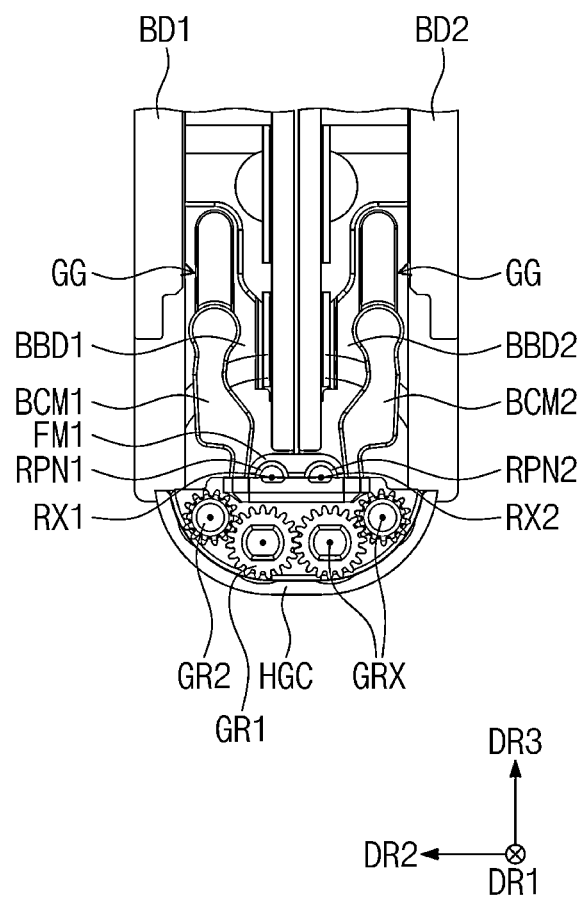

FIG. 18A is a cross-sectional view taken along line I-I' of FIG. 14. FIGS. 18B and 18C are cross-sectional views illustrating a folding operation of a folding set of FIG. 18A.

In the following description, FIG. 14 will be mentioned along with FIGS. 18A, 18B, and 18C, when necessary.

Referring to FIGS. 14, 18A, 18B, and 18C, the first and second rotation pin units RPN1 and RPN2 may be rotated about the first and second rotation axes RX1 and RX2, such that the folding set FST is folded. As the first and second rotation pin units RPN1 and RPN2 are rotated, the first and second bracket bodies BBD1 and BBD2 may be rotated about the first and second rotation axes RX1 and RX2, and such a rotation may lead to movement of the first and second bracket bodies BBD1 and BBD2.

As the first and second bracket bodies BBD1 and BBD2 are rotated, the first and second bodies BD1 and BD2 connected to the first and second bracket bodies BBD1 and BBD2 may be rotated about the first and second rotation axes RX1 and RX2, and such a rotation may lead to movement of the first and second bodies BD1 and BD2. In other words, the first and second rotation pin units RPN1 and RPN2 may provide the first and second rotation axes RX1 and RX2 to the first and second bodies BD1 and BD2, and the first and second bodies BD1 and BD2 may be rotated about the first and second rotation axes RX1 and RX2. In an embodiment, the first and second bodies BD1 and BD2 may face each other, and thus, the folding set FST may be folded in an in-folding manner.

The first and second gears GR1 and GR2 may be disposed below the first and second rotation pin units RPN1 and RPN2. When the first and second rotation pin units RPN1 and RPN2 are rotated, the first and second gears GR1 and GR2 may be rotated in conjunction with the first and second rotation pin units RPN1 and RPN2.

In detail, as a result of the movement of the first and second bracket bodies BBD1 and BBD2 that are rotated along with the first and second rotation pin units RPN1 and RPN2, the first and second bracket cams BCM1 and BCM2, which are coupled with the first and second bracket bodies BBD1 and BBD2, may be moved. As a result of the movement of the first and second bracket cams BCM1 and BCM2, the second gears GR2, which are coupled with the first and second bracket cams BCM1 and BCM2, may be rotated.

As a result of the rotation of the second gears GR2, the first gears GR1, which are engaged with the second gears GR2, may be rotated. In other words, as the first and second bracket cams BCM1 and BCM2 are moved through rotation, the first and second gears GR1 and GR2 may be rotated along with the first and second bracket cams BCM1 and BCM2. The first and second gears GR1 and GR2 may be respectively rotated about gear rotation axes GRX, which are parallel to the first direction DR1 and are defined at centers of the first and second gears GR1 and GR2 in the first direction DR1.

When the first and second bracket cams BCM1 and BCM2 are rotated, end portions of the first and second bracket cams BCM1 and BCM2 may be moved along the guide grooves GG defined in the first and second bracket bodies BBD1 and BBD2. When the folding set FST is folded, the first and second bracket cams BCM1 and BCM2 and the first and second bracket bodies BBD1 and BBD2 may be moved in a direction away from each other. Since the first and second bracket cams BCM1 and BCM2 are moved along the guide grooves GG, the first and second bracket bodies BBD1 and BBD2 may be more easily moved.

Figure 19A:
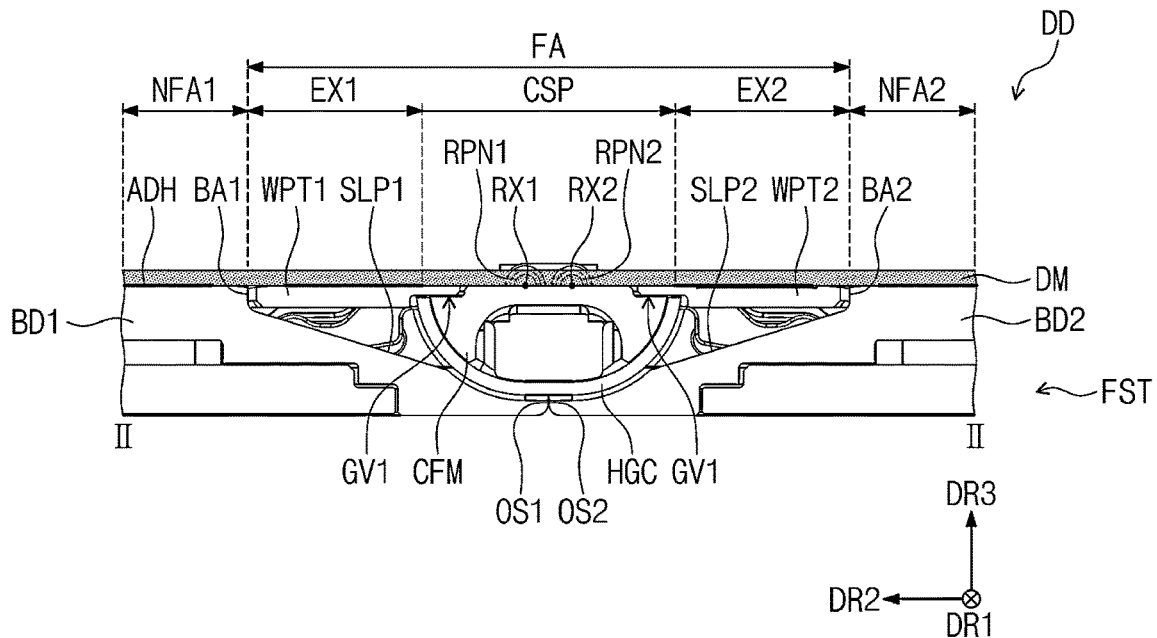
FIG. 19A is a cross-sectional view taken along line II-II' of FIG. 14.
Figure 19B:
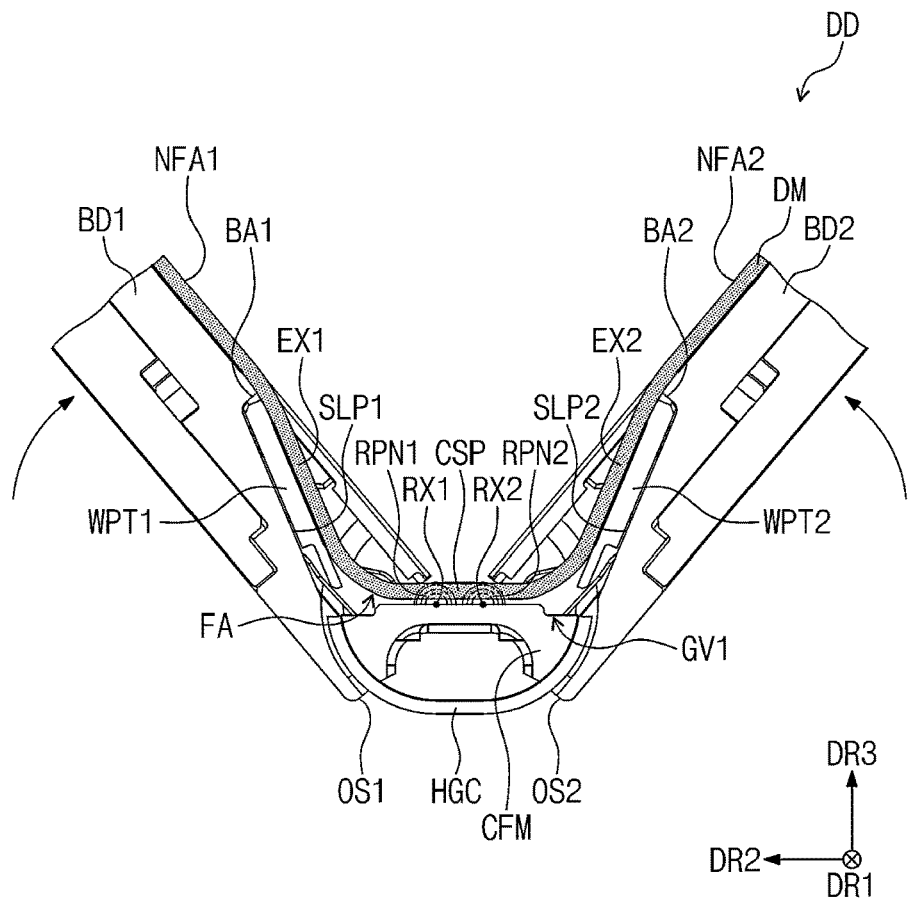
FIGS. 19B and 19C are cross-sectional views illustrating a folding operation of a folding set of FIG. 19A.
Figure 19C:
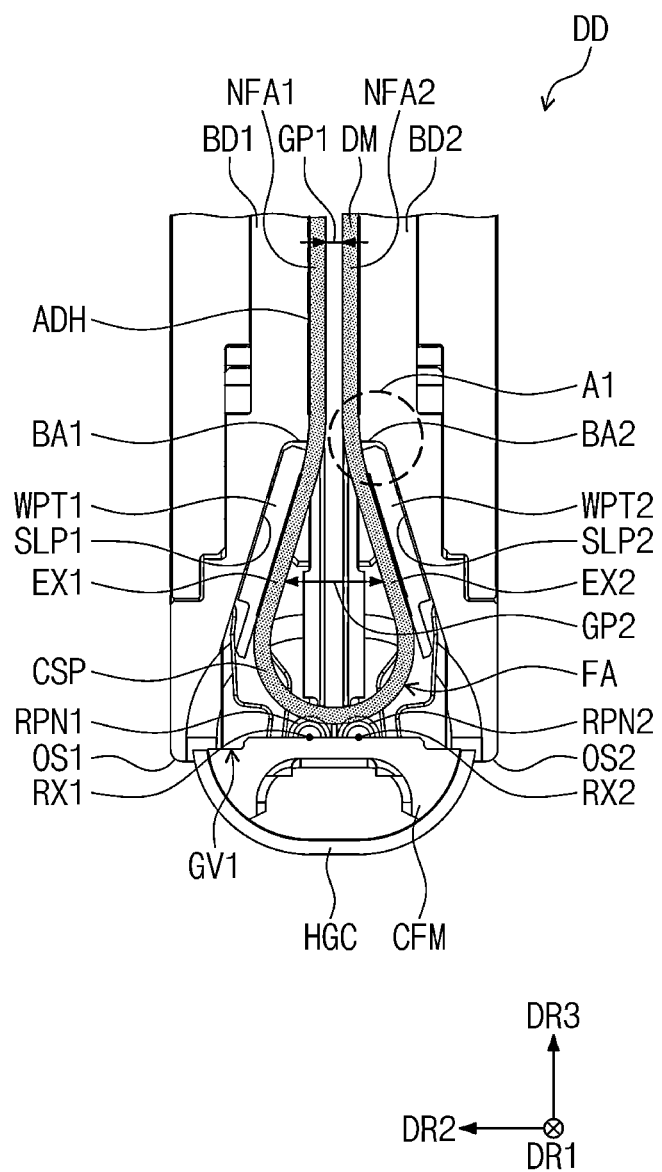

FIG. 19A is a cross-sectional view taken along line II-IP of FIG. 14. FIGS. 19B and 19C are cross-sectional views illustrating a folding operation of a folding set of FIG. 19A.

To provide better understanding of a folding state of the display module DM, not only the folding set FST but also the display module DM are illustrated in FIGS. 19A, 19B, and 19C.

Referring to FIG. 19A, the display module DM may be disposed on the folding set FST. The first body BD1 may be disposed below the first non-folding region NFA1, and the second body BD2 may be disposed below the second non-folding region NFA2. In a plan view, the first and second rotation axes RX1 and RX2 may be overlapped with the folding region FA. The first rotation axis RX1 and the second rotation axis RX2 may be disposed at a level lower than the top surface of the display module DM.

The center frame CFM may be disposed below the folding region FA. Although not shown, the first and second frames FM1 and FM2, which are arranged in the first direction DR1 and near the center frame CFM, may also be disposed below the folding region FA.

The first body BD1 may be extended to a region below the first extended portion EX1 and the curved surface portion CSP, and the second body BD2 may be extended to a region below the second extended portion EX2 and the curved surface portion CSP. The first and second bodies BD1 and BD2 may be adjacent to each other in the second direction DR2, below the curved surface portion CSP.

The top surface of the first body BD1 facing the first extended portion EX1 may be defined as the first inclined surface SLP1. The top surface of the first body BD1 below the first wing plate WPT1 may serve as the first inclined surface SLP1. The top surface of the second body BD2 facing the second extended portion EX2 may be defined as the second inclined surface SLP2. The top surface of the second body BD2 below the second wing plate WPT2 may serve as the second inclined surface SLP2. The heights of the first and second inclined surfaces SLP1 and SLP2 may be decreased toward the side portions OS1 and OS2 of the first and second bodies BD1 and BD2.

The first and second inclined surfaces SLP1 and SLP2 may form a stepwise structure, relative to the top surfaces of the first and second bodies BD1 and BD2 disposed below the first and second non-folding regions NFA1 and NFA2. A boundary between the first body BD1 and the first inclined surface SLP1, which are disposed below the first non-folding region NFA1, may be defined as the first boundary BA1. A boundary between the second body BD2 and the second inclined surface SLP2, which are disposed below the second non-folding region NFA2, may be defined as the second boundary BA2.

The first wing plate WPT1 may be disposed between the first inclined surface SLP1 and the first extended portion EX1. The first wing plate WPT1 may be adjacent to the first boundary BA1. The second wing plate WPT2 may be disposed between the second inclined surface SLP2 and the second extended portion EX2. The second wing plate WPT2 may be adjacent to the second boundary BA2.

The side portion of the first wing plate WPT1 and the side portion of the second wing plate WPT2, which face each other, may be disposed on both opposite side portions of the center frame CFM. The side portion of the first wing plate WPT1 and the side portion of the second wing plate WPT2, which face each other, may be disposed on the first grooves GV1, which are defined in both opposite side portions of the center frame CFM. Although not shown in FIG. 19A, the side portion of the first wing plate WPT1 and the side portion of the second wing plate WPT2 may be disposed on the second grooves GV2, which are defined in the second frame FM2.

The display device DD may further include an adhesive layer ADH. The adhesive layer ADH may be disposed between the first non-folding region NFA1 and the first body BD1 and between the second non-folding region NFA2 and the second body BD2. In addition, the adhesive layer ADH may be disposed between the first extended portion EX1 and the first wing plate WPT1 and between the second extended portion EX2 and the second wing plate WPT2.

The display module DM may be attached to the first and second bodies BD1 and BD2 and the first and second wing plates WPT1 and WPT2 by the adhesive layer ADH. In an embodiment, the adhesive layer ADH may be a double-sided tape, but the kind of the adhesive layer ADH is not limited thereto.

Referring to FIGS. 19B and 19C, the folding set FST may be folded along the first and second rotation axes RX1 and RX2, such that the display module DM is folded. The folding region FA may be curved, such that the display module DM is folded. The display module DM may be folded in an in-folding manner that the first and second non-folding regions NFA1 and NFA2 face each other.

The curved surface portion CSP may be curved to have a predetermined curvature, when the display module DM is folded. In other words, the curved surface portion CSP may be curved to have a predetermined curvature radius. In an embodiment, such a curvature radius may be set to be in a range of about 1.5 millimeters (mm) to about 5.0 mm (in particular, about 2.5 mm), for example.

A portion of the display module DM between the first extended portion EX1 and the first non-folding region NFA1 may be bent. The first extended portion EX1 may be curvedly extended from the first non-folding region NFA1 to the curved surface portion CSP. The first extended portion EX1, which is attached to the first wing plate WPT1 of the flat shape, may be maintained to a flat shape.

A portion of the display module DM between the second extended portion EX2 and the second non-folding region NFA2 may be bent. The second extended portion EX2 may be curvedly extended from the second non-folding region NFA2 to the curved surface portion CSP. The second extended portion EX2, which is attached to the second wing plate WPT2 of the flat shape, may be maintained to a flat shape.

When the display module DM is folded, the first wing plate WPT1 may be moved toward the first inclined surface SLP1 by a stress of the folding region FA and thereby may be in contact with the first inclined surface SLP1. When the display module DM is folded, the second wing plate WPT2 may be moved toward the second inclined surface SLP2 by the stress of the folding region FA and thereby may be in contact with the second inclined surface SLP2.

According to the afore-described folding structure, in the case where the display module DM is folded, a first distance GP1 between the first and second non-folding regions NFA1 and NFA2 may be smaller than a second distance GP2 between the first and second extended portions EX1 and EX2. The second distance GP2 may be gradually increased toward the curved surface portion CSP. Thus, when the display module DM is folded, the display module DM may be folded to have a dumbbell-like shape.

Referring to FIG. 19C, in the case where the first and second bodies BD1 and BD2 are respectively rotated by about 90 degrees)(° in clockwise and counterclockwise directions to fold the display device DD in the unfolded state, the folding region FA may not be in contact with the center frame CFM. In an embodiment, the curved surface portion CSP of the folding region FA may not be in contact with the center frame CFM, even when the display device DD is folded, for example.

Referring to FIGS. 18C and 19C, since the first and second gears GR1 and GR2 are disposed below the rotation pin units RPN1 and RPN2, the first and second rotation axes RX1 and RX2 may be disposed at a level higher than the gear rotation axes GRX.

The position of the curved surface portion CSP may be changed depending on the positions of the first and second rotation axes RX1 and RX2. When the first and second rotation axes RX1 and RX2 are disposed at a further lower level to be adjacent to the gear rotation axes GRX or the folding set FST is realized to be overlapped with the gear rotation axes GRX, the position of the curved surface portion CSP may be changed to a further lower position, such that the curved surface portion CSP is in contact with the center frame CFM. In this case, the curved surface portion CSP may be damaged by repetitive folding and unfolding operations of the display device DD.

However, in an embodiment, since the first and second rotation axes RX1 and RX2 are disposed at a level higher than the gear rotation axes GRX, the curved surface portion CSP may not be in contact with the center frame CFM, when the display device DD is folded. As a result, the curved surface portion CSP may be prevented from being damaged.

Figure 20:
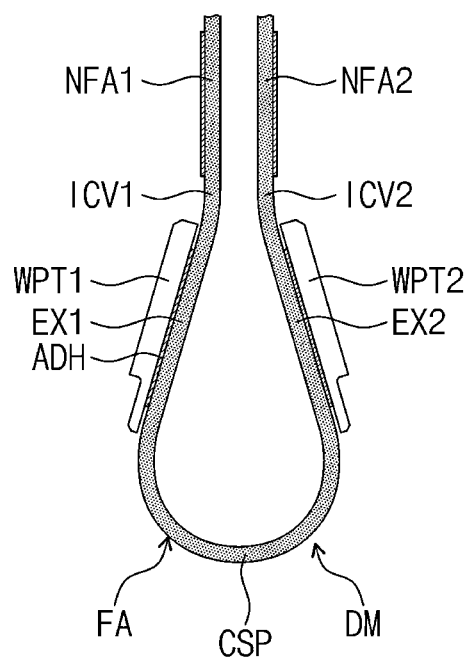
FIG. 20 is an enlarged cross-sectional view of a display module of FIG. 19C.

FIG. 20 is an enlarged cross-sectional view of a display module of FIG. 19C.

The first and second wing plates WPT1 and WPT2 and the adhesive layer ADH, along with the display module DM, are illustrated in FIG. 20. In addition, for convenience in description, the adhesive layer ADH is illustrated to be thicker than that in FIGS. 19A, 19B, and 19C.

Referring to FIG. 20, the display module DM may include a first inverse curvature portion ICV1, which is defined as a portion of the display module DM between the first non-folding region NFA1 and the first extended portion EX1, and a second inverse curvature portion ICV2, which is defined as a portion of the display module DM between the second non-folding region NFA2 and the second extended portion EX2. When the display module DM is folded, the first inverse curvature portion ICV1 and the second inverse curvature portion ICV2 may be bent in an opposite manner to the curved surface portion CSP.

The adhesive layer ADH may not be disposed in regions below the curved surface portion CSP and below the first and second inverse curvature portions ICV1 and ICV2. The regions below the curved surface portion CSP and below the first and second inverse curvature portions ICV1 and ICV2 may be defined as regions, which are disposed below the bottom surface of the display module DM that is opposite to a front surface (e.g., the display surface) of the display module DM displaying an image.

Since the adhesive layer ADH is not disposed below the curved surface portion CSP, the curved surface portion CSP may be more easily curved. In addition, since the adhesive layer ADH is not disposed below the first and second inverse curvature portions ICV1 and ICV2, the first and second inverse curvature portions ICV1 and ICV2 may be more easily curved.

Figure 21:
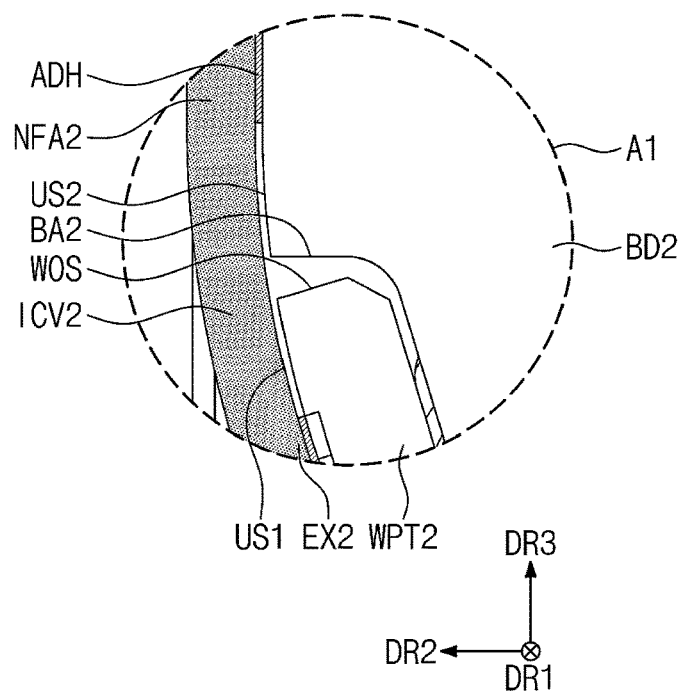
FIG. 21 is an enlarged cross-sectional view of a first region A1 of FIG. 19C.
Figure 22:
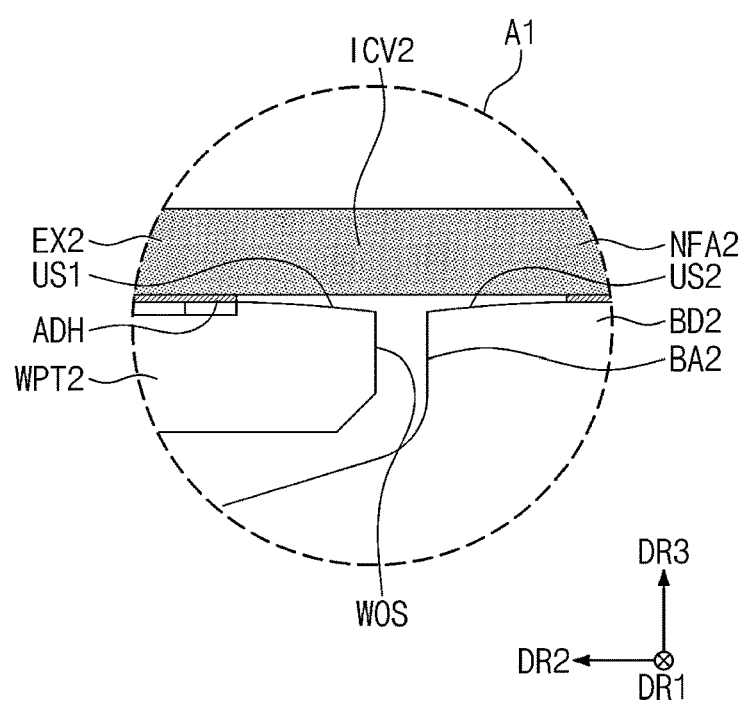
FIG. 22 is an enlarged cross-sectional view illustrating an unfolding state of a second inverse curvature portion of FIG. 21.

FIG. 21 is an enlarged cross-sectional view of a first region A1 of FIG. 19C. FIG. 22 is an enlarged cross-sectional view illustrating an unfolding state of the second inverse curvature portion of FIG. 21.

In detail, FIG. 21 illustrates a structure near the second inverse curvature portion ICV2 during a folding operation of the display device DD, and FIG. 22 illustrates the structure near the second inverse curvature portion ICV2 during an unfolding operation of the display device DD.

The structure near the second inverse curvature portion ICV2 is illustrated in FIGS. 21 and 22, but the structure near the first inverse curvature portion ICV1, which is not illustrated in FIG. 21, may be substantially the same as the structure near the second inverse curvature portion ICV2.

Referring to FIGS. 21 and 22, the top surface of the second body BD2 and the top surface of the second wing plate WPT2, which are adjacent to each other, may have curved surfaces. In an embodiment, a first top surface US1 of the second wing plate WPT2, which is adjacent to the second boundary BA2, and a second top surface US2 of the second body BD2, which is disposed below the second non-folding region NFA2 and adjacent to the second boundary BA2, may have the curved surfaces, for example.

The top surface of the first body BD1 and the top surface of the first wing plate WPT1, which are adjacent to each other, may have curved surfaces, although not shown. In an embodiment, a first top surface of the first wing plate WPT1, which is adjacent to the first boundary BA1, and a second top surface of the first body BD1, which is disposed below the first non-folding region NFA1 and adjacent to the first boundary BA1, may have the curved surfaces, for example.

The second boundary BA2 and a side portion WOS of the second wing plate WPT2, which is adjacent to the second boundary BA2, may be adjacent to a center portion of the second inverse curvature portion ICV2. Although not shown, the first boundary BA1 and a side portion of the first wing plate WPT1, which is adjacent to the first boundary BA1, may be adjacent to a center portion of the first inverse curvature portion ICV1.

As shown in FIG. 21, when the display module DM is folded, a curved surface of the first top surface US1 and a curved surface of the second top surface US2 may have a curved surface corresponding to the curved surface of the second inverse curvature portion ICV2. The curved surface of the first top surface US1 and the curved surface of the second top surface US2 may have substantially the same curvature as that of the curved surface of the second inverse curvature portion ICV2. The curved surface of the first top surface US1 and the curved surface of the second top surface US2 may have substantially the same curvature as that of the bottom surface of the second inverse curvature portion ICV2.

Although not shown, when the display module DM is folded, the first top surface of the first wing plate WPT1 adjacent to the first boundary BA1 and the second top surface of the first body BD1 adjacent to the first boundary BA1 may have a curved surface corresponding to the curved surface of the first inverse curvature portion ICV1.

Since the first and second top surfaces US1 and US2 have the curved surfaces, the second inverse curvature portion ICV2 may be more easily curved along the first and second top surfaces US1 and US2.

Figure 23:
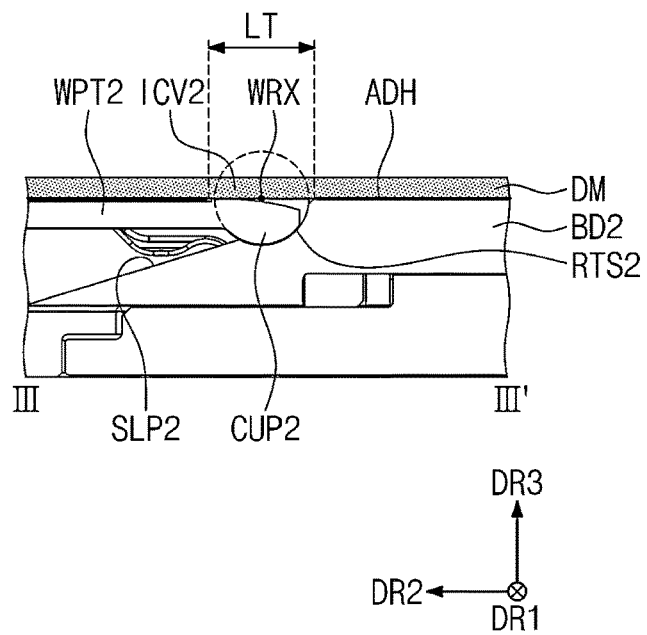
FIG. 23 is a cross-sectional view taken along line of FIG. 14.
Figure 24:
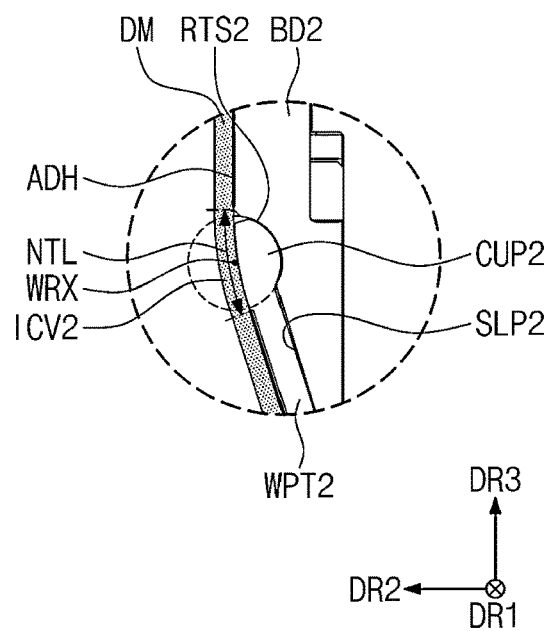
FIG. 24 is an enlarged cross-sectional view illustrating an unfolding state of a second inverse curvature portion of FIG. 23.

FIG. 23 is a cross-sectional view taken along line of FIG. 14. FIG. 24 is an enlarged cross-sectional view illustrating an unfolding state of the second inverse curvature portion of FIG. 23.

In detail, FIG. 23 illustrates a structure near the second inverse curvature portion ICV2 during the unfolding operation of the display device DD, and FIG. 24 illustrates the structure near the second inverse curvature portion ICV2 during the folding operation of the display device DD. In order to provide better understanding of the invention, the display module DM is also illustrated in FIGS. 23 and 24.

Some of elements, which are provided near the second inverse curvature portion ICV2 in FIG. 23, are briefly illustrated in the circular dotted line of FIG. 24. Although a structure near the second inverse curvature portion ICV2 is illustrated in FIGS. 23 and 24, a structure near the first inverse curvature portion ICV1, which is not illustrated in FIGS. 23 and 24, may also be substantially the same as that near the second inverse curvature portion ICV2.

In the following description, FIGS. 9 and 14 will be mentioned along with FIGS. 23 and 24, when necessary.

Referring to FIGS. 9, 14, 23, and 24, the second rotation surface RTS2 defined in the second body BD2 may have a concavely curved surface. Although not shown, the first rotation surface RTS1 defined in the first body BD1 may also have a concavely curved surface.

The second coupling portion CUP2 of the second wing plate WPT2 may have a convexly curved surface and may be in contact with the second rotation surface RTS2. A curvature of the second coupling portion CUP2 may be substantially equal to a curvature of the second rotation surface RTS2. Although not shown, the first coupling portion CUP1 of the first wing plate WPT1 may also have a convexly curved surface and may be in contact with the first rotation surface RTS1.

A center of a circle, which is defined by the curved surface of the second coupling portion CUP2, may be defined as a wing rotation axis WRX. The second coupling portion CUP2 may be rotated through movement along the curved surface of the second rotation surface RTS2, when the display module DM is folded. In other words, the second coupling portion CUP2 may be rotated about the wing rotation axis WRX, when the display module DM is folded.

Although not shown, the first coupling portion CUP1 may be rotated along the wing rotation axis WRX, which is adjacent to the first rotation surface RTS1, thereby being rotated along the curved surface of the first rotation surface RTS1, when the display module DM is folded.

The display module DM and the afore-described bezel cover BZC may be disposed on the first and second wing plates WPT1 and WPT2 to fasten the first and second wing plates WPT1 and WPT2. Thus, the first and second coupling portions CUP1 and CUP2 may be easily disposed on the first and second rotation surfaces RTS1 and RTS2, without separation from the first and second rotation surfaces RTS1 and RTS2.

Owing to the afore-described structure, the first and second coupling portions CUP1 and CUP2 may be easily rotated while being in contact with the first and second rotation surfaces RTS1 and RTS2, even when pins are not used to couple the first and second coupling portions CUP1 and CUP2 to the first and second bodies BD1 and BD2.

The wing rotation axis WRX may be set by the following method.

The wing rotation axis WRX adjacent to the second inverse curvature portion ICV2 may be set in such a way that a length of a neutral plane NTL of the second inverse curvature portion ICV2, when the second inverse curvature portion ICV2 is bent, becomes equal to a length of the second inverse curvature portion ICV2 in the second direction DR2 (shown FIG. 24), when the second inverse curvature portion ICV2 is unfolded.

In detail, a portion of the display module DM corresponding to the second inverse curvature portion ICV2 may be bent to have a desired curvature. Hereinafter, the portion of the display module DM corresponding to the second inverse curvature portion ICV2 will be referred to a curvature portion. A top surface of the curvature portion may be widened when the curvature portion is bent than when the curvature portion is flat, and a bottom surface of the curvature portion may be shrunken when bent than when flat. Thus, a tensile stress may be produced on the top surface of the curvature portion, and a compressive stress may be produced on the bottom surface of the curvature portion.

The tensile stress and the compressive stress may be compensated in the curvature portion, and there may be a portion, in which the net stress is zero. A portion of the curvature portion, in which the net stress is zero, may be defined as the neutral plane NTL of the curvature portion.

A length of the neutral plane NTL, which is indicated by a double arrow in FIG. 24, may be measured. In the FIG. 23, the length of the neutral plane NTL may be equal to a length of the second inverse curvature portion ICV2 in the second direction DR2 when the curvature portion is unfolded. That is, a straight length LT of the second inverse curvature portion ICV2 shown FIG. 23 may be set to the length of the neutral plane NTL shown FIG. 24.

A rotation axis may be set in such a way that the straight length LT of the second inverse curvature portion ICV2 is equal to the length of the neutral plane NTL, and a circle may be defined to have its center point on the rotation axis. The curved surface of the second coupling portion CUP2 and the curved surface of the second rotation surface RTS2 may be determined based on the defined circle. The rotation axis may be the afore-described wing rotation axis WRX. That is, when the display module DM is bent along a predetermined rotation axis, the straight length of the second inverse curvature portion ICV2 may become equal to the length of the neutral plane NTL.

Similarly, the wing rotation axis WRX adjacent to the first inverse curvature portion ICV1 may be set in such a way that a length of the neutral plane of the first inverse curvature portion ICV1, when the first inverse curvature portion ICV1 is bent, becomes equal to a length of the first inverse curvature portion ICV1 in the second direction DR2, when the first inverse curvature portion ICV1 is unfolded.

Figure 25:
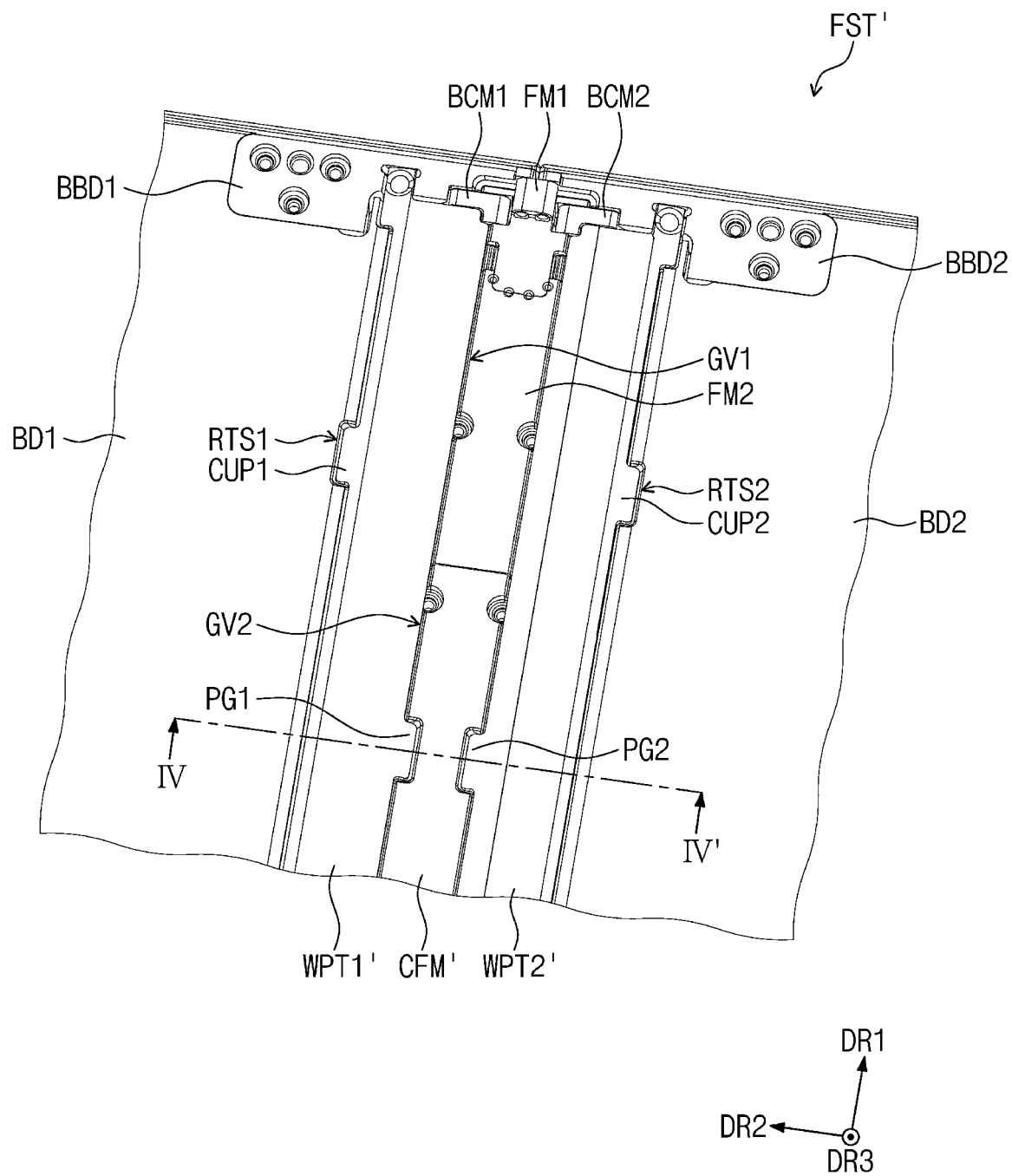
FIG. 25 is a diagram illustrating an embodiment of a folding set according to the invention.

FIG. 25 is a diagram illustrating an embodiment of a folding set according to the invention.

In detail, a perspective view corresponding to FIG. 14 is illustrated in FIG. 25.

In the following description of a folding set FST' of FIG. 25, features different from the folding set FST of FIG. 14 will be mainly explained, and the same element will be identified using the same reference number.

Referring to FIG. 25, the folding set FST' may include a plurality of protruding guides PG1 and PG2, which protrude from first and second wing plates WPT1' and WPT2'. The protruding guides PG1 and PG2 may protrude from a side portion of the first wing plate WPT1' and a side portion of the second wing plate WPT2', which face each other. The protruding guides PG1 and PG2 may protrude toward a center frame CFM'.

The protruding guides PG1 and PG2 may include a first protruding guide PG1, which protrudes from the side portion of the first wing plate WPT1', and a second protruding guide PG2, which protrudes from the side portion of the second wing plate WPT2'. Although one first protruding guide PG1 and one second protruding guide PG2 are illustrated, a plurality of the first protruding guides PG1 and a plurality of the second protruding guides PG2 may be provided.

Figure 26A:
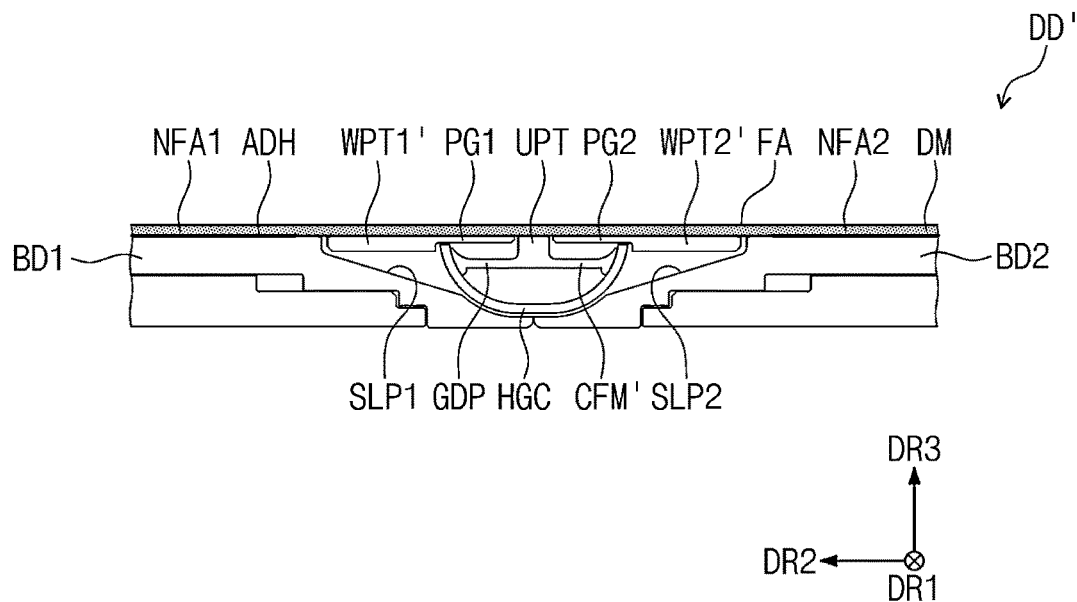
FIG. 26A is a cross-sectional view taken along line IV-IV' of FIG. 25.
Figure 26B:
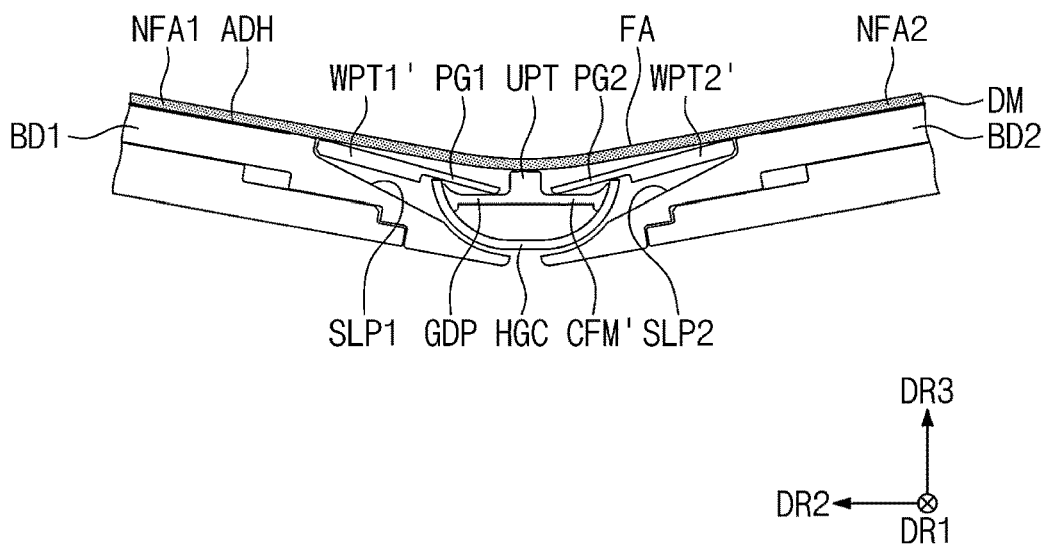
FIGS. 26B to 26E are cross-sectional views illustrating a folding operation of a folding set of FIG. 26A.
Figure 26C:
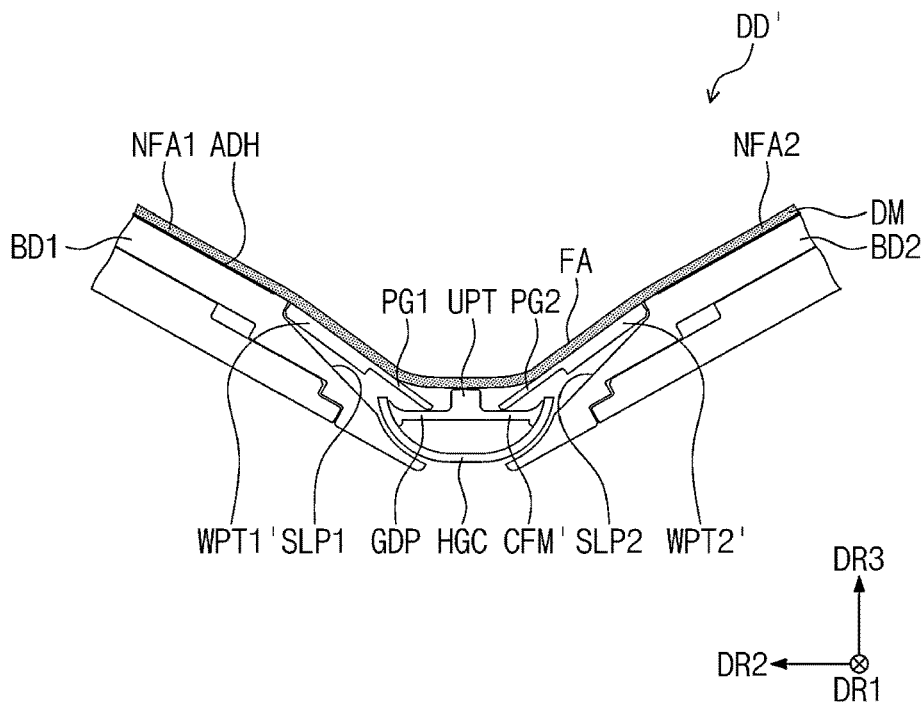
Figure 26D:
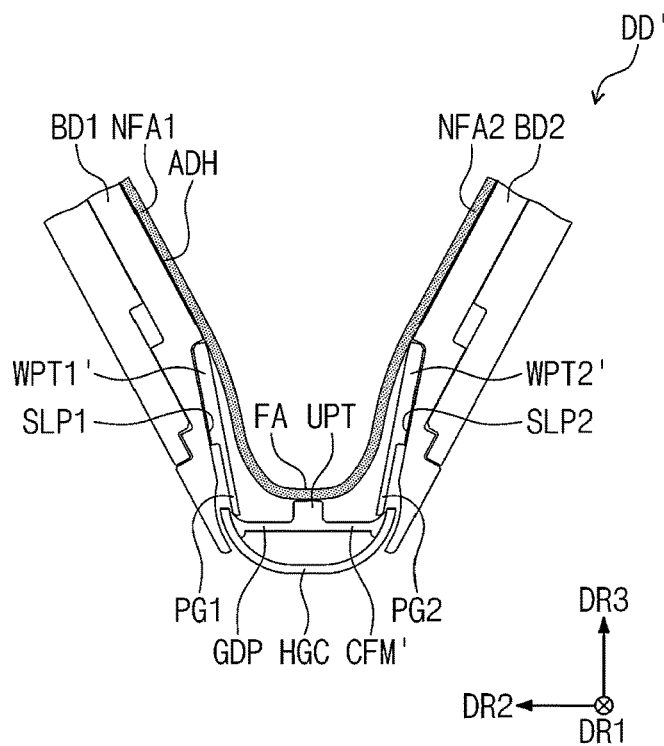
Figure 26E:
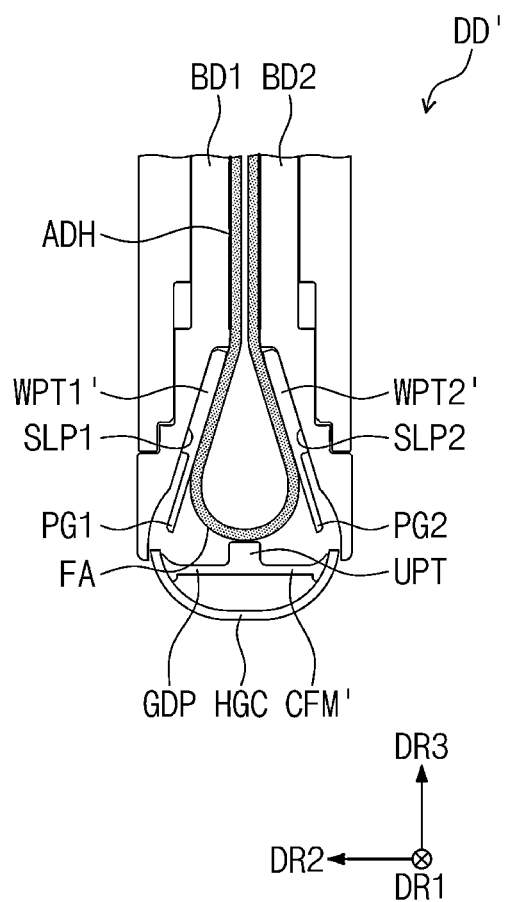

FIG. 26A is a cross-sectional view taken along line IV-IV' of FIG. 25.

To provide better understanding of the invention, the display module DM, along with the folding set FST', are illustrated in FIG. 26A. For convenience in illustration, the first and second bodies BD1 and BD2, the center frame CFM', the hinge cover HGC, and first and second wing plates WPT1' and WPT2' are illustrated in FIG. 26A.

Referring to FIG. 26A, the hinge cover HGC may be disposed below the center frame CFM'. The center frame CFM' may include a guide portion GDP and an upper protruding portion UPT, which protrudes from the guide portion GDP toward the folding region FA. The guide portion GDP may be included in the center frame CFM'. Both opposite side portions of the guide portion GDP, which are opposite to each other in the second direction DR2, may be disposed adjacent to an upper portion of the center frame CFM'. The upper protruding portion UPT may protrude more upward than the center frame CFM'.

The first and second protruding guides PG1 and PG2 may be disposed on the guide portion GDP. The upper protruding portion UPT may be disposed between the first protruding guide PG1 and the second protruding guide PG2. A top surface of the guide portion GDP may have a curved surface.

In an embodiment, the top surface of the guide portion GDP adjacent to the hinge cover HGC may have a curved surface, for example.

The adhesive layer ADH may be disposed below the first and second non-folding regions NFA1 and NFA2. The adhesive layer ADH may not be disposed below the folding region FA. Thus, unlike the structure of FIG. 19A, the adhesive layer ADH may not be disposed between the first and second extended portions EX1 and EX2 and the first and second wing plates WPT1' and WPT2'. Accordingly, the first and second wing plates WPT1' and WPT2' may not be attached to the first and second extended portions EX1 and EX2.

FIGS. 26B to 26E are cross-sectional views illustrating a folding operation of a folding set of FIG. 26A.

Referring to FIGS. 26B to 26E, the folding set FST' may be folded such that the display device DD' is folded. When the folding set FST' is folded, the first protruding guide PG1 and the second protruding guide PG2 may be moved along the top surface of the guide portion GDP. The top surface of the guide portion GDP may guide the movement of the first protruding guide PG1 and the movement of the second protruding guide PG2. When the folding set FST' is folded, the first protruding guide PG1 and the second protruding guide PG2 may be moved in a direction away from the upper protruding portion UPT.

Even when the first and second wing plates WPT1' and WPT2' are attached to the first and second extended portions EX1 and EX2, the first and second wing plates WPT1' and WPT2' may be easily moved, because the first and second protruding guides PG1 and PG2 are moved along the top surface of the guide portion GDP.

In an embodiment of the invention, a display module may be easily folded in a dumbbell shape, and a folding region of the display module may be prevented from being damaged.

While embodiments of the invention have been particularly shown and described, it will be understood by one of ordinary skill in the art that variations in form and detail may be made therein.

What is claimed is:

1. A display device, comprising:
a display module including a first non-folding region, a second non-folding region, and a folding region disposed between the first and second non-folding regions;
a first body disposed on the first non-folding region;
a second body disposed on the second non-folding region;
a plurality of rotation pin units connected to the first and second bodies to provide a biaxial rotation axis, which is overlapped with the folding region, to the first and second bodies; and
a plurality of gears which rotate in conjunction with the plurality of rotation pin units,
wherein when the display module is unfolded, the plurality of gears are disposed below the plurality of rotation pin units and spaced apart from the plurality of rotation pin units.

2. The display device of claim 1, wherein the biaxial rotation axis, the plurality of rotation pin units, and the plurality of gears are extended in a first direction, and
the first non-folding region, the folding region, and the second non-folding region are extended in a second direction crossing the first direction.

3. The display device of claim 2, wherein the plurality of gears comprises:
a plurality of first gears extended in the first direction and engaged with each other in the second direction; and
a plurality of second gears extended in the first direction and spaced apart from each other with the plurality of first gears interposed therebetween in the second direction,
wherein the plurality of first gears and the plurality of second gears are engaged with each other in the second direction to rotate about gear rotation axes parallel to the first direction.

4. The display device of claim 3, further comprising:
a first frame, into which side portions of the plurality of rotation pin units and side portions of the plurality of first and second gears are inserted; and
a second frame, into which opposite side portions of the plurality of first and second gears are inserted.

5. The display device of claim 4, further comprising:
a plurality of bracket bodies connected to first and second rotation pin units of the plurality of rotation pin units and the first and second bodies; and
a plurality of bracket cams disposed in grooves, which are defined in side portions of the first frame which are opposite to each other in the second direction,
wherein the side portions of the plurality of second gears are inserted into side portions of the plurality of bracket cams disposed in the grooves, and
opposite side portions of the plurality of bracket cams are moved along guide grooves, which are defined in the bracket bodies and are extended in the second direction, when the plurality of rotation pin units is rotated.

6. The display device of claim 4, further comprising:
a plurality of moving cams, which are spaced apart from each other in the first direction, and into which the plurality of first gears is inserted;
a plurality of rotating cams, into which the plurality of first gears is respectively inserted, and which are adjacent to the plurality of moving cams; and
a plurality of springs, into which the plurality of first gears is respectively inserted,
wherein the plurality of moving cams, the plurality of rotating cams, and the plurality of springs are disposed in the second frame,
each of the plurality of moving cams is disposed between a pair of a rotating cam of the plurality of rotating cams and a spring of the plurality of springs, which are disposed on a corresponding one of the plurality of first gears,
a surface of a moving cam of the plurality of moving cams and a surface of the rotating cam, which are disposed on the same one of the plurality of first gears to face each other, each comprise a plurality of protruding portions, and
the plurality of protruding portions of the moving cam and the plurality of protruding portions of the rotating cam, which are disposed on the same one of the plurality of first gears, are staggered to each other.

7. The display device of claim 2, wherein the folding region comprises:
a curved surface portion, which is bent to have a predetermined curvature when the display module is folded;
a first extended portion between the first non-folding region and the curved surface portion; and
a second extended portion between the second non-folding region and the curved surface portion.

8. The display device of claim 7, wherein a distance between the first non-folding region and the second non-folding region is smaller than a distance between the first extended portion and the second extended portion, when the display module is folded.

9. The display device of claim 7, wherein the first body is extended to a region on the first extended portion,
- the second body is extended to a region on the second extended portion,
- a surface of the first body facing the display module and facing the first extended portion has a first inclined surface,
- a surface of the second body facing the display module and facing the second extended portion has a second inclined surface,
- the first and second inclined surfaces have a stepwise structure, relative to the surfaces of the first and second bodies facing the display module and disposed on the first and second non-folding regions, and
- heights of the first and second inclined surfaces are decreased toward a side portion of the first body and a side portion of the second body, which face each other.

10. The display device of claim 9, further comprising:
- a first wing plate, which is disposed between the first extended portion and the first inclined surface and is rotatably coupled to a first rotation surface of the first body which is overlapped with a first boundary between a surface of the first body facing the display module and disposed on the first non-folding region and the first inclined surface;
- a second wing plate, which is disposed between the second extended portion and the second inclined surface and is rotatably coupled to a second rotation surface of the second body which is overlapped with a second boundary between a surface of the first body facing the display module and disposed on the second non-folding region and the second inclined surface; and
- a center frame disposed between the first wing plate and the second wing plate,
- wherein a side portion of the first wing plate and a side portion of the second wing plate, which face each other, are disposed in grooves, which are defined in portions of side portions of the center frame which face the display module and are opposite to each other in the second direction.

11. The display device of claim 10, further comprising an adhesive layer, which is disposed between the first and second non-folding regions and the first and second bodies and
- between the first and second extended portions and the first and second wing plates.

12. The display device of claim 11, wherein, when the display module is folded, the display module further comprises:
- a first inverse curvature portion, which is defined in a portion of the display module between the first non-folding region and the first extended portion and is bent in an opposite manner to the curved surface portion; and
- a second inverse curvature portion, which is defined in a portion of the display module between the second non-folding region and the second extended portion and is bent in an opposite manner to the curved surface portion.

13. The display device of claim 12, wherein the adhesive layer is not disposed on the curved surface portion and on the first and second inverse curvature portions.

14. The display device of claim 12, wherein first surfaces of the first and second wing plates, which face the display module and are disposed adjacent to the first and second boundaries, and second surfaces of the first and second bodies, which face the display module and are disposed on the first and second non-folding regions and adjacent to the first and second boundaries, have curved surfaces.

15. The display device of claim 12, wherein the first and second boundaries and side portions of the first and second wing plates, which are adjacent to the first and second boundaries, are adjacent to center portions of the first and second inverse curvature portions.

16. The display device of claim 12, wherein first and second surfaces of the first and second wing plates facing the display module have curved surfaces corresponding to curved surfaces of the first and second inverse curvature portions, when the display module is folded.

17. The display device of claim 12, wherein the first and second rotation surfaces have concavely curved surfaces,
- the first wing plate comprises a first coupling portion, which has a convexly curved surface in contact with the first rotation surface, and
- the second wing plate comprises a second coupling portion, which has a convexly curved surface in contact with the second rotation surface.

18. The display device of claim 17, wherein center points of circles, which are defined by the curved surfaces of the first and second coupling portions, are set in such a way that lengths of neutral planes of the first and second inverse curvature portions are equal to lengths of the first and second inverse curvature portions, respectively, in the second direction, when the first and second inverse curvature portions are unfolded, and
- the first and second coupling portions are respectively rotated about wing rotation axes, which are defined at the center points.

19. The display device of claim 10, further comprising:
- a center frame disposed on the folding region, the center frame including a guide portion and a protruding portion, which protrudes from the guide portion toward the folding region; and
- a plurality of protruding guides disposed on the guide portion, the plurality of protruding guides protruding from the first and second wing plates toward the center frame,
- wherein the protruding portion is disposed between a first protruding guide of the first wing plate and a second protruding guide of the second wing plate, and
- the first protruding guide and the second protruding guide are moved along a surface of the guide portion facing the display module and in a direction away from the protruding portion, when the display module is folded.

20. A display device, comprising:
- a display module including a first non-folding region, a second non-folding region, and a folding region disposed between the first and second non-folding regions;
- a first body disposed on the first non-folding region;
- a second body disposed on the second non-folding region;
- a hinge connected to the first and second bodies to provide a biaxial rotation axis to the first and second bodies;
- a first wing plate rotatably coupled to a portion of the first body, which is adjacent to a side portion of the first body facing the second body; and
- a second wing plate rotatably coupled to a portion of the second body, which is adjacent to a side portion of the second body facing the side portion of the first body,
- wherein a surface of the first body facing the display module and a surface of the first wing plate facing the display module, which are adjacent to each other, and a surface of the second body facing the display module and a surface of the second wing plate facing the display module, which are adjacent to each other, are all curved surfaces.

21. The display device of claim 20, wherein a surface of the first body facing the display module on the first wing plate has a first inclined surface, a surface of the second body facing the display module on the second wing plate has a second inclined surface, the first wing plate is rotatably coupled to a first rotation surface of the first body which is overlapped with a first boundary between a surface of the first body facing the display module on the first non-folding region and the first inclined surface, and the second wing plate is rotatably coupled to a second rotation surface of the second body which is overlapped with a second boundary between a surface of the first body facing the display module on the second non-folding region and the second inclined surface.

22. The display device of claim 21, wherein the first and second rotation surfaces have concavely curved surfaces, the first wing plate comprises a first coupling portion, which has a convexly curved surface in contact with the first rotation surface, and the second wing plate comprises a second coupling portion, which has a convexly curved surface in contact with the second rotation surface.

23. A display device, comprising:

a display module;

a first body disposed on the display module;

a second body disposed on the display module and spaced apart from the first body;

a plurality of rotation pin units providing a biaxial rotation axis to the first and second bodies;

a plurality of bracket bodies connecting the plurality of rotation pin units to the first and second bodies;

a first frame, to which the plurality of rotation pin units is coupled;

a plurality of gears, which are disposed on the plurality of rotation pin units, are rotated in conjunction with the plurality of rotation pin units, and are coupled to the first frame; and a plurality of bracket cams including side portions coupled to some of the plurality of gears, wherein opposite side portions of the plurality of bracket cams are moved along guide grooves, which are defined in the bracket bodies, when the display module is folded.

* * * * *